US006695291B2

(12) United States Patent
Kleimeyer et al.

(10) Patent No.: US 6,695,291 B2
(45) Date of Patent: Feb. 24, 2004

(54) RAPID-WINDING WINCH FOR AMUSEMENT RIDE

(76) Inventors: Mark Kleimeyer, P.O. Box 27540, 120 Dragon Cir., Panama City Beach, FL (US) 32411; Michael J. Mehrman, 210 Trexler Dr., Atlanta, GA (US) 30342

( * ) Notice: Subject to any disclaimer, the term of this patent is extended or adjusted under 35 U.S.C. 154(b) by 0 days.

(21) Appl. No.: 10/201,713

(22) Filed: Jul. 23, 2002

(65) Prior Publication Data

US 2002/0193170 A1 Dec. 19, 2002

Related U.S. Application Data

(62) Division of application No. 09/848,641, filed on May 3, 2001, now Pat. No. 6,561,916.
(60) Provisional application No. 60/265,823, filed on Feb. 1, 2001.

(51) Int. Cl.[7] .................................................. B66D 1/00
(52) U.S. Cl. ....................... 254/266; 472/131; 472/130; 472/136
(58) Field of Search ................................ 254/283, 266, 254/278, 284, 285, 286; 472/42, 49, 50, 131, 130, 136, 137; 267/166, 168, 169, 172

(56) References Cited

U.S. PATENT DOCUMENTS

| 1,151,476 | A | | 8/1915 | Klette |
| 2,221,215 | A | | 11/1940 | Eyerly |
| 3,039,758 | A | | 6/1962 | Gratzmuller et al. |
| 3,498,472 | A | | 3/1970 | Rodgers et al. |
| 4,201,113 | A | | 5/1980 | Seecamp |
| 5,421,783 | A | * | 6/1995 | Kockelman et al. ........ 472/117 |
| 5,522,321 | A | * | 6/1996 | Mosley et al. ................ 104/60 |
| 5,649,866 | A | | 7/1997 | Balwanz |
| 5,810,671 | A | | 9/1998 | Balwanz et al. |
| 5,893,802 | A | | 4/1999 | Böhme |
| 6,146,418 | A | * | 11/2000 | Berman ........................ 623/8 |
| 6,319,140 | B1 | * | 11/2001 | Mirfin et al. ................ 472/131 |
| 6,497,623 | B2 | * | 12/2002 | Mirfin et al. ................ 472/131 |

FOREIGN PATENT DOCUMENTS

| DE | 197 24 273 A1 | 12/1998 |
| WO | WO 99/47221 | 9/1999 |

* cited by examiner

Primary Examiner—Emmanuel Marcelo
(74) Attorney, Agent, or Firm—Michael J. Mehrman; Mehrman Law Office, PC

(57) ABSTRACT

Drums 56 wind and unwind cables 18 connected to a passenger carriage 14 of an amusement ride 12 in response to winding and unwinding of tethers 48 about an axle 46. The tethers 48 are connected to elastic members 44 that store energy, and a lock 32 is releasable to permit the carriage 14 to travel under the force of the stored energy. The drums 56 have a diameter that is greater than a diameter of the axle, thereby providing a mechanical advantage to launch and accelerate the carriage 14 to a high velocity and/or to provide a dampening effect on the motion of the carriage. Alternative embodiments include ramps with loops, corkscrew sections, and/or inclined sections for carrying the carriage, safety cables strung through attachment members connected to the tethers, and telescopic spring devices with concentric coil springs.

16 Claims, 22 Drawing Sheets

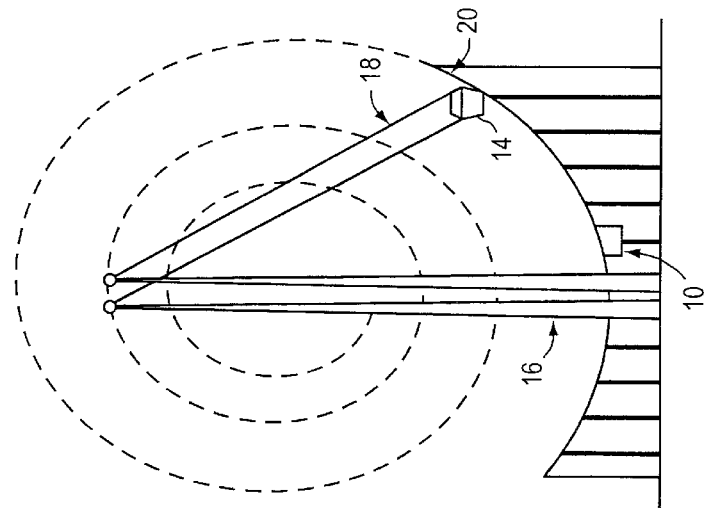
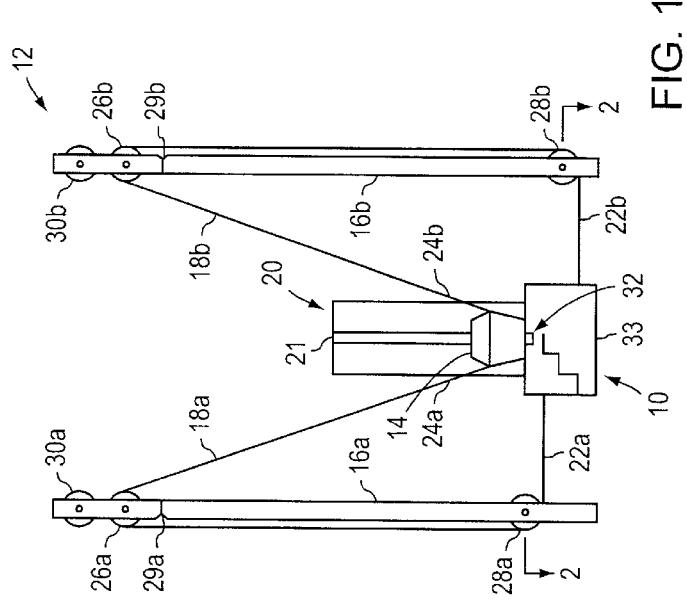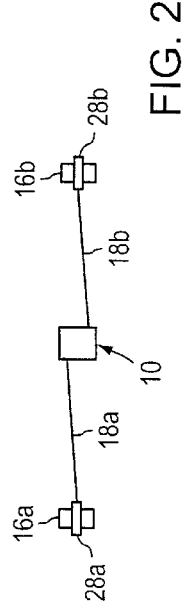

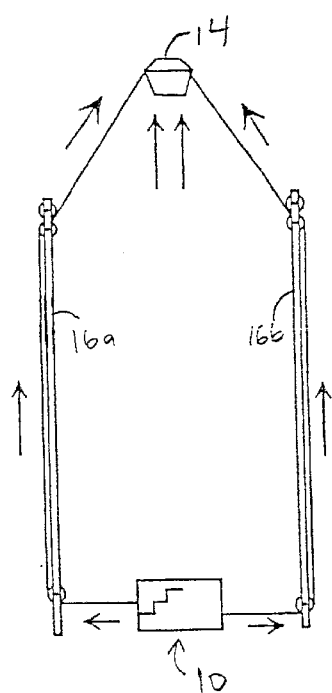
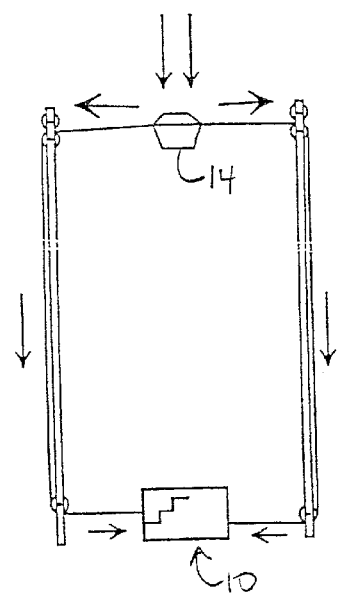
FIG. 6B
FIG. 6C
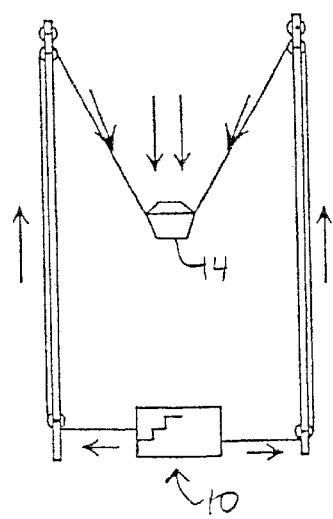
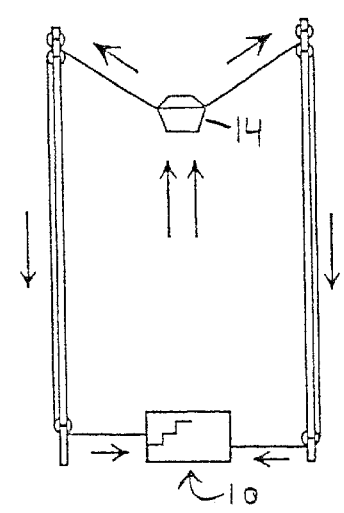
FIG. 6D
FIG. 6E

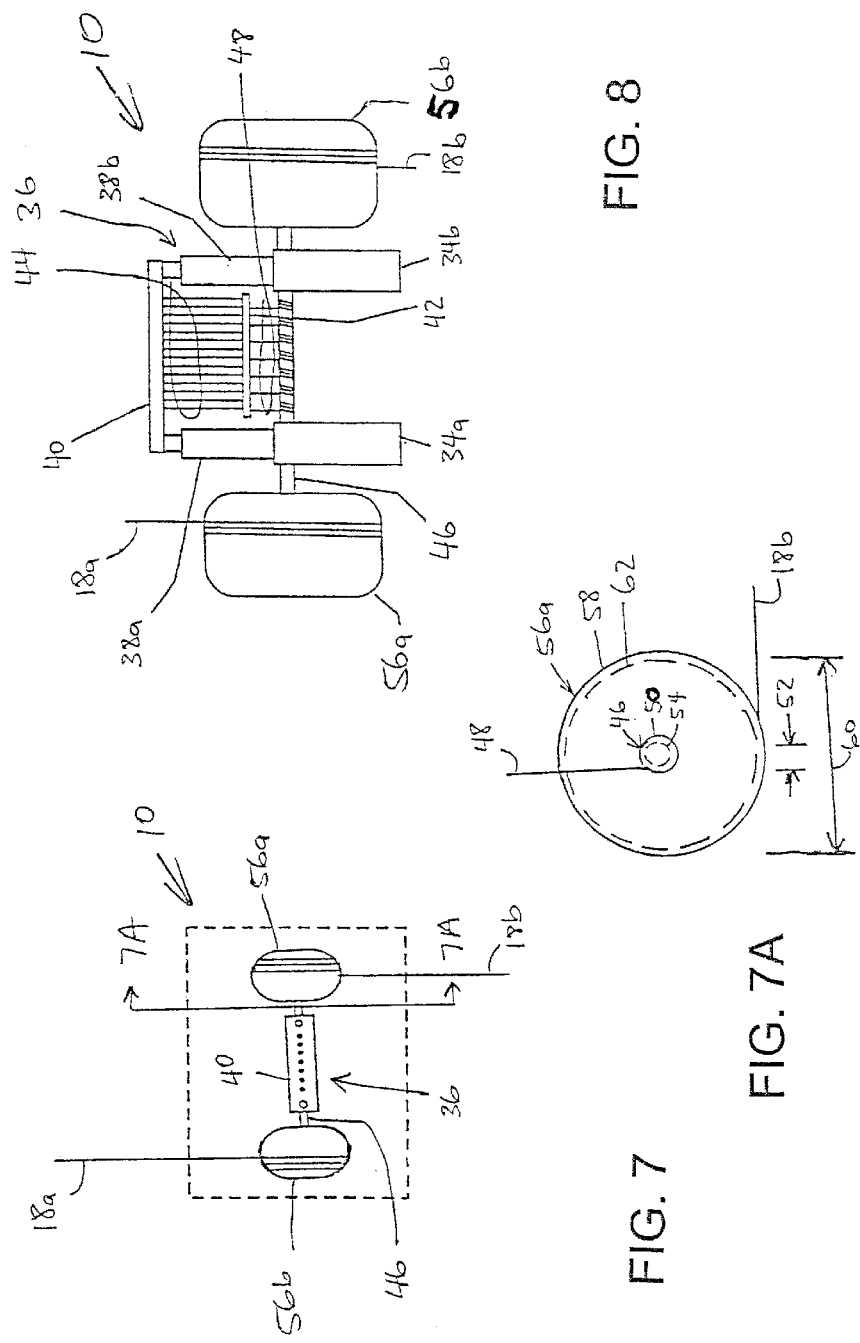

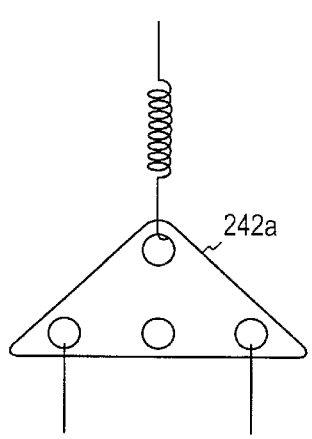 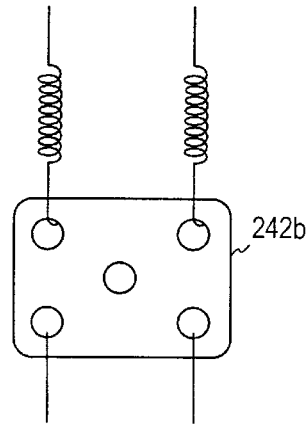 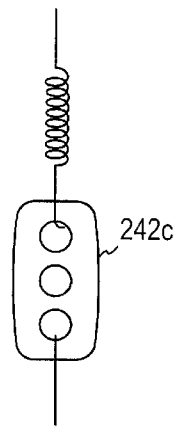
FIG. 15          FIG. 16          FIG. 17
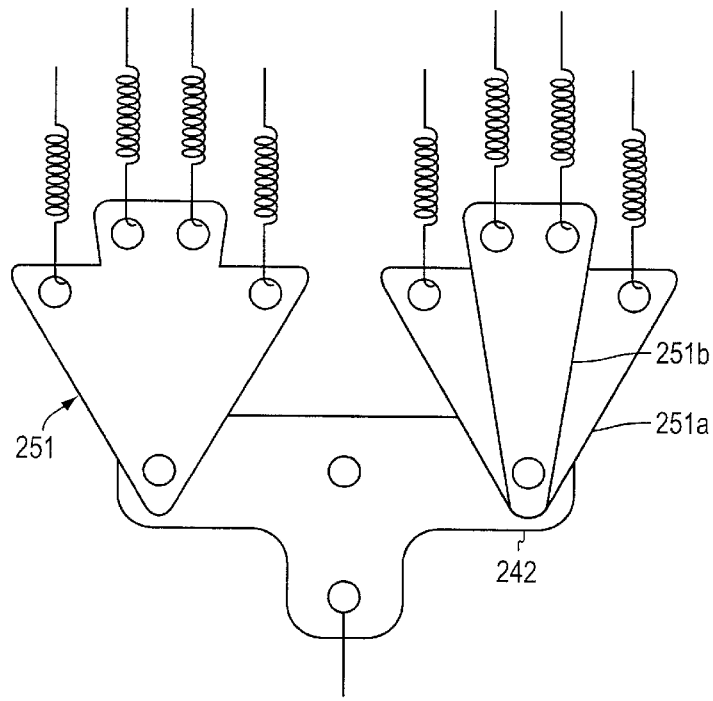
FIG. 18

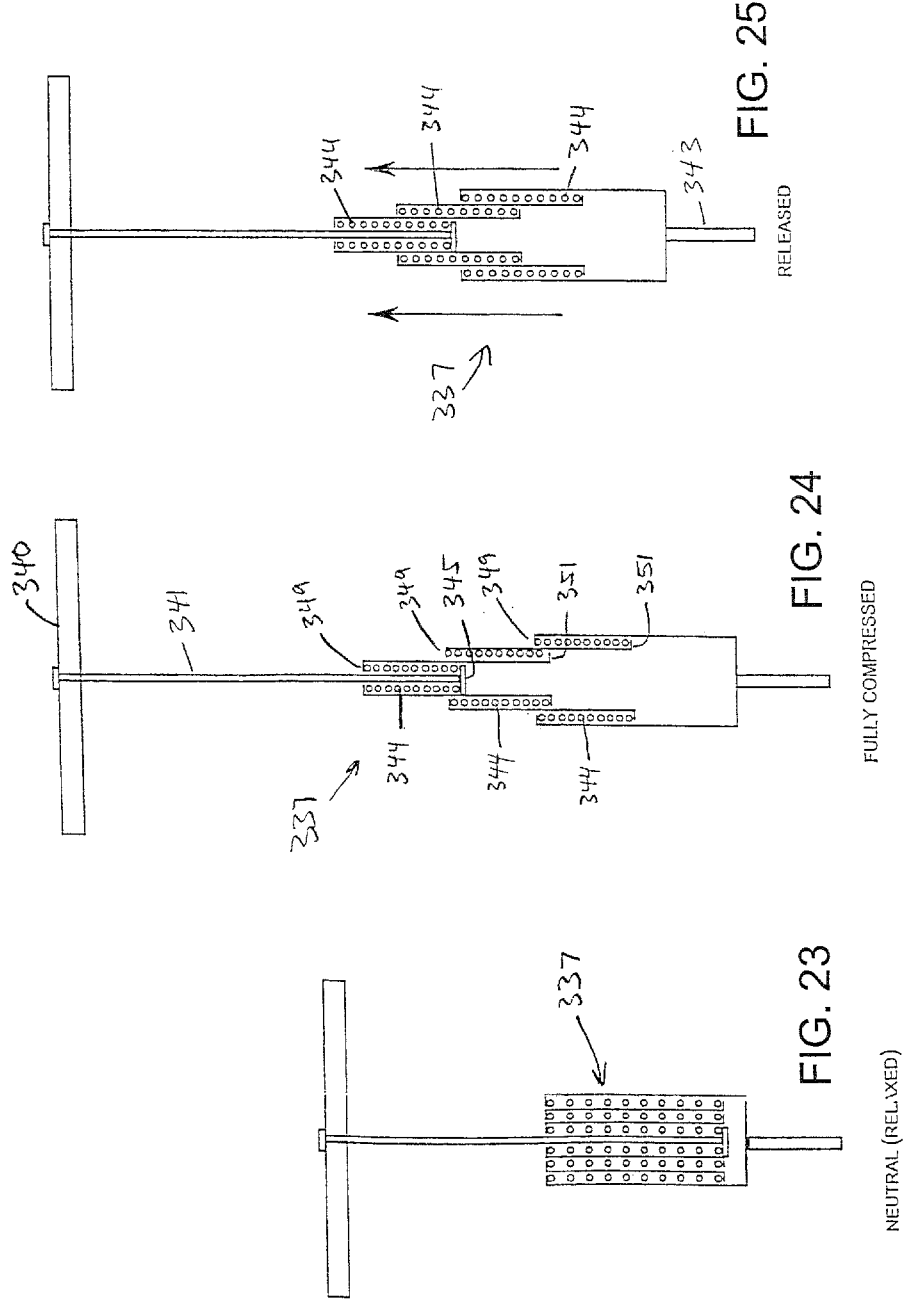

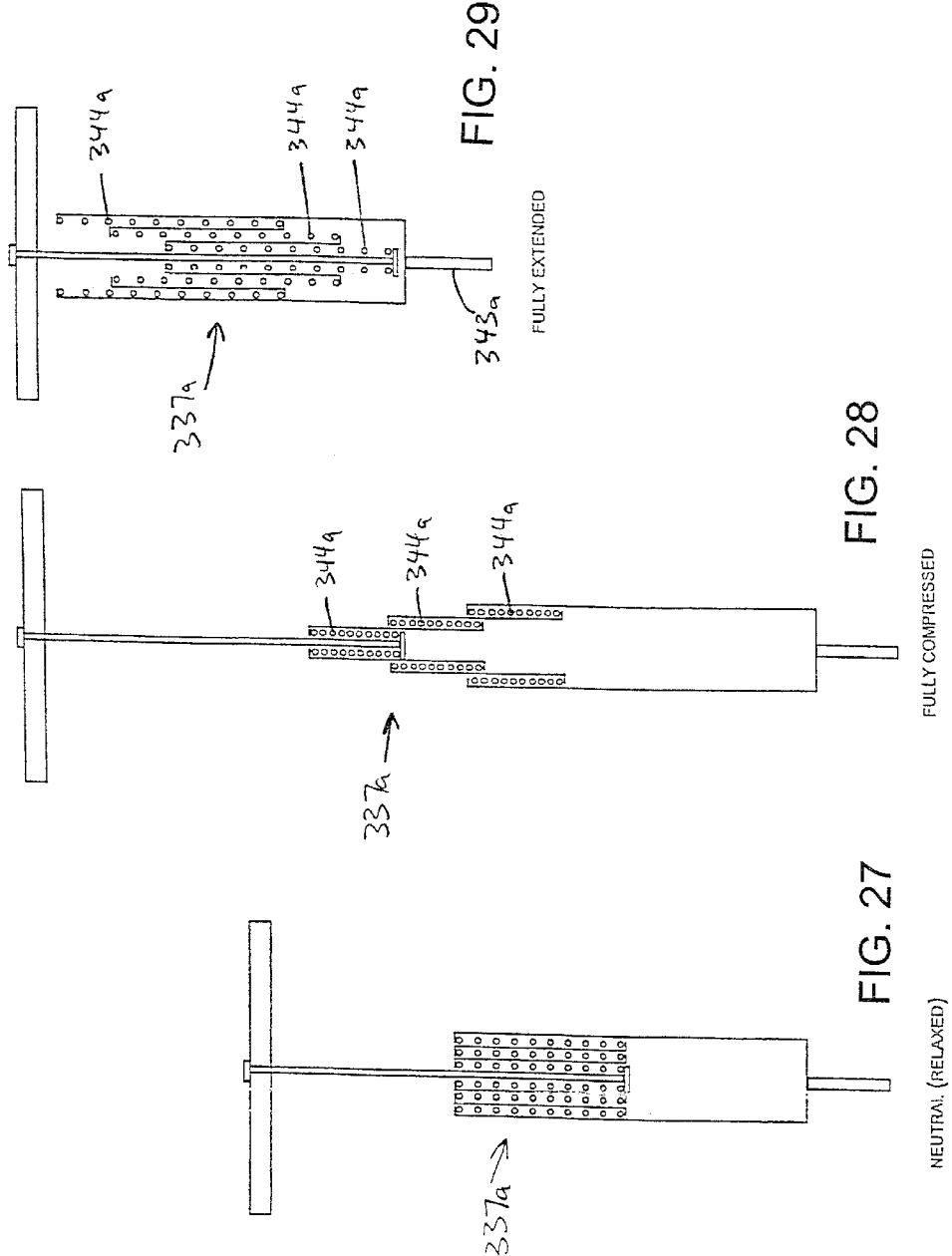

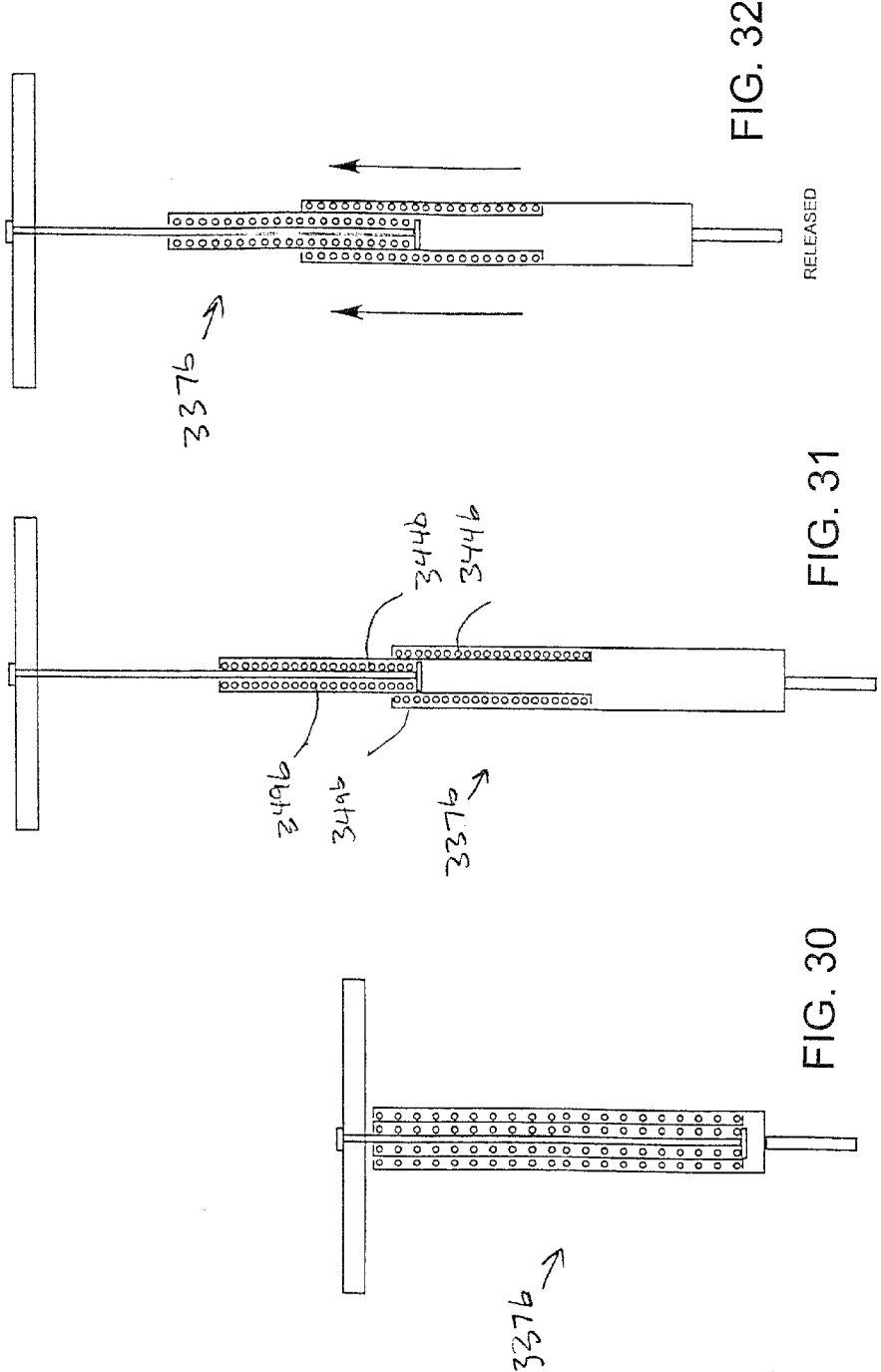

RAPID-WINDING WINCH FOR AMUSEMENT RIDE

CROSS REFERENCE TO RELATED APPLICATION

This application is a division of 09/848,641 filed May 3, 2001 now 6,561,916.

This application claims the priority benefit of U.S. Provisional Application No. 60/265,823 filed on Feb. 1, 2001, which is hereby incorporated by reference in its entirety.

TECHNICAL FIELD

The present invention relates to amusement rides and, more particularly, to a rapid-winding winch for launching and accelerating the carriage of an amusement ride to a high velocity in a short time.

BACKGROUND OF THE INVENTION

Amusement rides of a variety of types have provided great thrills to many people over the years. Well known rides include roller coasters, parachute and elevator drops, bungee jumps and free fall rides, vertical accelerator rides, and so forth. Typical vertical accelerator rides have a passenger carriage connected to bungee cords or other elastic members such as springs. The bungee cords are connected to cables that are routed around pulleys at the top of towers and pulleys at the bottom of the towers, with the cables connected to a mechanism that winds them to tension the bungee cords. A locking mechanism secures the carriage in place while the bungee cords are tensioned, and releases the carriage to launch the carriage into motion under the force of the tensioned bungee cords. Such typical vertical accelerator rides are disclosed by U.S. Pat. No. 5,810,671, U.S. Pat. No. 5,649,866, and U.S. Pat. No. 5,421,783, which are hereby incorporated by reference in their entirety.

In the use of such vertical accelerator rides, however, the connections of the bungee cords to the cables weaken due to the mechanical stresses and strains caused by the frequent stretching of the bungee cords. If left unchecked, this connection and/or the bungee cord itself will eventually fail. When there is such a failure while the ride is in use, the result is often injury or death to the passengers in the carriage. In order to maintain the safety of the ride, the operator of the ride must frequently change out the bungee cords and/or the connections of the bungee cords to the cables. This can be a costly and time-consuming procedure in materials and labor. Furthermore, because of the potential for injury or death to passengers, some people consider all vertical accelerator rides with bungee cords to be inherently unsafe, even though a particular ride may be properly maintained.

In order to eliminate the maintenance costs and the stigma associated with bungee cords, it is desirable to design and operate vertical accelerator rides without bungee cords. One known design provides cables that connect directly to the passenger carriage, without intermediate bungee cord sections, and with a mechanism for forcefully yanking the cables to launch the carriage into the air. Such a mechanism is disclosed by PCT Patent Application No. WO99/47,221. The mechanism of this apparatus uses an array of springs, a ram for loading the springs, and an array of pulleys for rapidly unwinding the cables thereabout when the springs are unloaded to achieve a mechanical advantage.

The large number of pulleys, however, have several drawbacks. The friction from the cables winding around all of the pulleys results in energy loss which reduces the effectiveness of the mechanism and heat generation which degrades the strength characteristics of the cable. Also, the cables are of a heavy gauge for strength, but have to bend around the pulleys at a relatively small radius for such heavy gauge cable, resulting in stresses that weaken the cables. Furthermore, the large number of pulleys are costly to purchase, assemble, lubricate, maintain, and replace.

Accordingly, what is needed but not found in the prior art is a mechanism that launches a carriage of an amusement ride to a high velocity in a short period of time, but that does not have bungee cords connected to the carriage and that does not stress and degrade the cables. Additionally, there is a need for a launch mechanism that also provides an automatic braking and dampening action subsequent to launching the carriage. Furthermore, there is a need for such a mechanism that is safe, reliable, and cost-effective to make and use.

SUMMARY OF THE INVENTION

In view of the foregoing, it will be appreciated that the present invention provides a rapid-winding winch for an amusement ride that launches a carriage of the amusement ride to a high velocity in a short period of time, without the deficiencies of the prior art. The winch can be used in conjunction with a variety of types of amusement rides, including vertical accelerator rides, roller coasters, parachute and elevator drops, bungee jumps and free fall rides, merry-go-rounds, dragster and rocket launcher rides, and so forth.

For example, the winch can be used with a vertical accelerator ride that has two towers, a passenger carriage, and cables that are routed around pulleys on the towers and connected between the carriage and the winch. The winch has a rapid-winding capability for launching the carriage with great acceleration to achieve the desired thrill of the ride. Because of the rapid-winding capability of the winch, the cables can be connected directly to and between the carriage and the winch, without intermediate cord sections having bungee cords or springs. Because the launching force is provided by the winch and because there are no cable sections or connections requiring frequent replacement, the stigma of unsafety is avoided.

Generally described, the winch comprises an energy storage mechanism having one or more elastic members such as springs, one or more tethers coupled to the elastic members, an axle with the tethers windable and unwindable about the surface of the axle, and drums coupled to the axle with the cables windable and unwindable about the surface of the drums. Actuators such as hydraulic cylinders operate to extend the elastic members and thereby charge and store energy in the elastic members. A releasable lock such as a magnet secures the carriage in place while the carriage is loaded with passengers and while the elastic members are charged. Also, the elastic members can be connected between attachment members, with the tethers connected to one of the attachment members.

In one aspect of the invention, the drum surfaces have a diameter that is greater than a diameter of the axle surface, thereby providing a mechanical advantage when winding and unwinding the cables to move the carriage. When the carriage is unlocked, the tethers are pulled rapidly upward with great force by the charged elastic members, thereby unwinding the tethers from the axle and causing the axle to rotate. When the axle rotates, the drums also rotate because they are connected together. As the drums rotate, they wind in the cables from around the pulleys, thereby launching the carriage. Because of the fractional ratio of the axle diameter to the drum diameters, one revolution of the drums winds in a much greater length of cable than the length of tether that is wound out in one revolution of the axle. In this manner, the carriage can be launched with great acceleration in response to the winch axle rotating only a few revolutions, or only a part of one revolution.

In another aspect of the invention, the number, length, and strength of the elastic members, the travel and power of the actuators, and the height of the towers are selected so that the elastic members are discharged before the carriage reaches the tops of the towers. After the carriages passes the tops of the towers, its momentum will then recharge the elastic members until the carriage reaches the apex of its oscillatory trajectory, then the elastic members will again discharge to thrust the carriage back downward. In this manner, the carriage will continue this cycle until the elastic members are completely discharged, at which time the ride is completed and/or relaunched.

In yet another aspect of the invention, the drum surfaces have at least one groove for receiving the cables in a spiral, layered arrangement, so that the cable is wound in on top of itself. Also, the axle surfaces can have grooves in a coiled, side-by-side arrangement for receiving and directing the tetherstransversely along the axle surface, for minimizing energy loss and the risk of tangles.

In a further aspect of the invention, a ramp is provided for guiding the path of the carriage when launched by the winch. The ramp can have a shape that is circular or oval, and/or have sections that are linear, curved, sinusoidal, corkscrew, or of another shape. The carriage can be movably attached to the ramp by a race member, roller mechanism, wheels, or another mechanism, and the ramp can have one of more release ramps. In this manner, the carriage can be launched by the winch along the ramp and directed by a release ramp into an oscillating, looping, spiral, linear, or other motion.

In another aspect of the invention, the carriage is provided by a harness that a rider wears and that is connected to the cable, and a launch frame from (which the rider jumps) is connected to the tower in an elevated position. When the rider jumps and falls from the launch frame, his or her weight on the cables charges the energy storage mechanism. Then the charged energy storage mechanism pulls the rider back upwardly in an oscillatory motion. Thus, in this form of the invention, the actuator and lock need not be provided.

In a further aspect of the invention, the attachment members that connect the elastic members and the tethers each have an opening, and a safety cable or other member is routed through the openings. In this manner, even if one of the elastic members were to break, the safety cable would hold the corresponding attachment member so that the tether would not be able to wind in and the cable would not be able to rapidly and uncontrollably unwind. Also, multiple elastic members and multiple tethers can be connected to each attachment member.

In yet another aspect of the invention, the energy storage mechanism is provided by telescopic spring devices where the elastic members are provided by concentric coil springs. The coil springs are positioned within concentric sleeves having flanges that engage the ends of the coil springs to compress the springs when the actuators are operated. In this manner, the energy storage mechanism is charged by the compression of the springs and, therefore, even if a spring were to fail, the cable would not be able to rapidly and uncontrollably unwind. This provides for enhanced safety and eliminates the possibility of catastrophic failure of the ride.

In still a further aspect of the invention, there is provided a method for propelling a carriage of an amusement ride. The method can include locking the carriage in a fixed position, charging and storing energy in one or more elastic members, and unlocking the carriage so that it is free to move. The method can further include winding out one or more tethers from a surface of an axle, wherein the tethers are coupled to the elastic members and are wound out under the force of the energy stored in the elastic members; winding in one or more cables about a surface of one or more drums connected to the axle, wherein the cables are wound in responsive to the winding out of the tethers about the axle, the drum surfaces diameter being greater than the axle surface diameter to provide a mechanical advantage; and propelling the carriage in response to the winding in of the cables about the drums, wherein the cables are connected to the carriage. Additionally, the method can comprise winding out the cable from the drums to store a charge in the elastic members, and returning the carriage to locked position.

The specific techniques and structures employed by the invention to improve over the drawbacks of the prior systems and accomplish the advantages described above will become apparent from the following detailed description of the embodiments of the invention and the appended drawings and claims.

BRIEF DESCRIPTION OF THE DRAWINGS

FIG. 1 is a front elevation view of an exemplary winch of the present invention with an amusement ride in the form of a vertical accelerator ride.

FIG. 2 is a cross sectional view of the winch and vertical accelerator ride taken at line 2—2 of FIG. 1.

FIG. 3 is a side elevation view of the winch and vertical accelerator ride of FIG. 1, showing the path of the carriage.

FIG. 6B is a front elevation view of the winch and ride of FIG. 6A, showing the carriage as it approaches the maximum altitude of its travel.

FIG. 6C is a front elevation view of the winch and ride of FIG. 6A, showing the carriage as it returns back down.

FIG. 6D is a front elevation view of the winch and ride of FIG. 6A, showing the carriage as it reaches the bottom of its oscillating path.

FIG. 6E is a front elevation view of the winch and ride of FIG. 6A, showing the carriage on its second trip upward after being launched into its oscillating path.

FIG. 7 is a plan view of the exemplary winch of FIG. 1.

FIG. 7A is a cross sectional view the exemplary winch taken at line 7A—7A of FIG. 7.

FIG. 8 is a side elevation view of the exemplary winch of FIG. 1, showing elastic members, tethers wound about an axle, and cables wound about drums.

FIG. 15 is a side view of an alternative attachment member for connecting one elastic member to two tethers.

FIG. 16 is a side view of an alternative attachment member for connecting two elastic members to two tethers.

FIG. 17 is a side view of an alternative attachment member for connecting one elastic member to one tether.

FIG. 18 is a side view of an alternative attachment member for connecting multiple elastic members to one tether.

FIG. 23 is a side elevation view of the telescopic spring device of FIG. 22 in operation, showing the concentric coil springs in a neutral state.

FIG. 24 is a side elevation view of the telescopic spring device of FIG. 22 in operation, showing the coil springs being compressed.

FIG. 25 is a side elevation view of the telescopic spring device of FIG. 22 in operation, showing the compressed coil springs discharging.

FIG. 27 is a side elevation view of the telescopic spring device of FIG. 26 in operation, showing the concentric coil springs in a neutral state.

FIG. 28 is a side elevation view of the telescopic spring device of FIG. 26 in operation, showing the coil springs being compressed.

FIG. 29 is a side elevation view of the telescopic spring device of FIG. 26 in operation, showing the coil springs discharged of compression and now extending to be recharged under tension.

FIG. 30 is a side elevation view of another alternative telescopic spring device similar to that of FIG. 22, showing two sets of concentric springs and sleeves.

FIG. 31 is a side elevation view of the telescopic spring device of FIG. 30 in operation, showing the coil springs being compressed.

FIG. 32 is a side elevation view of the telescopic spring device of FIG. 30 in operation, showing the compressed coil springs discharging.

DETAILED DESCRIPTION OF THE EXEMPLARY EMBODIMENTS

Figure 4:
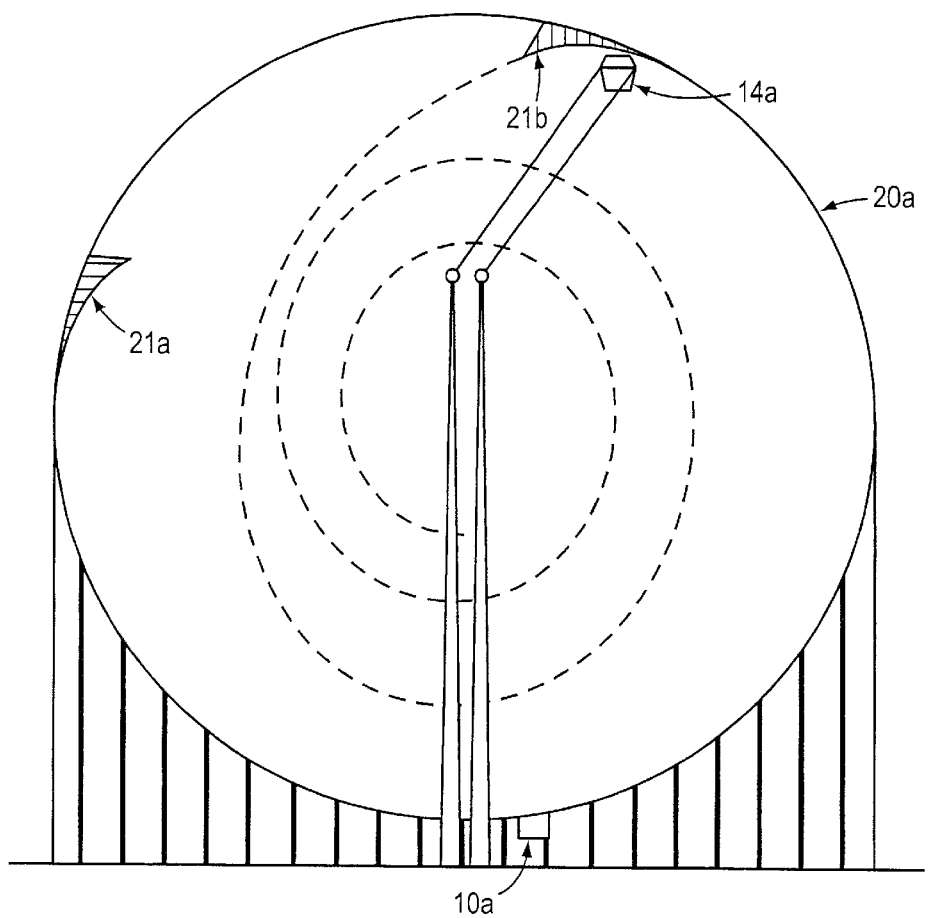
FIG. 4 is a side elevation view of the winch with a first alternative vertical accelerator ride, showing the path of the carriage.

Referring to FIGS. 1–3, there is provided an exemplary embodiment of the present invention, referred to generally as winch 10, in use with an amusement ride. The winch 10 is shown used with a vertical accelerator ride 12, but the winch 10 can be used in conjunction with other types of amusement rides, such as roller coasters, parachute and elevator drops, bungee jumps and free fall rides, merry-go-rounds, and so forth.

The vertical accelerator ride 12 can include a passenger carriage 14, two launch towers 16a and 16b (collectively, the "towers 16"), and two launch cables (collectively, the "cables 18"). The carriage 14 can hold one or multiple passengers, with seats and seatbelts as are typically used for amusement rides such as roller coasters. For example, the carriage can be provided by a cage, car, capsule, other enclosure or frame, one (or more) person harness, strap, or belt, or another structure for holding one or more passengers or inanimate objects. Also, the carriage 14 can be movably connected to and/or supported on a launch ramp 20, as may be desired to provide an oscillating, looping, spiral, linear, or other motion of the carriage.

The towers 16 can be of a lattice, monopole, or other construction, permanently mounted into the ground or provided by the boom of a crane or the like. Also, the number, height and position of the towers 16 can be selected for producing a desired motion and stability of the carriage 14. For example, two towers 16 can be provided with the carriage 14 positioned an equal distance between the towers 16. Also, the towers 16 can be provided with a height of about 150 feet, for launching the carriage 14 to a height greater than that. Alternatively, three or another number of towers can be provided, shorter or taller towers can be provided, the carriage can be disposed closer to one of the towers, or other arrangements can be suitably employed. Furthermore, the carriage can be disposed between the sides of walls, in a canyon, or in a recessed area, the carriage can be suspended from a bridge or other structure, or other elevated members can be provided instead of towers.

The cables 18 can be provided by wire rope, lifting cable, or the like, made of a material such as steel, as are commonly used in the crane industry. The size, shape, and material of the cables 18 are selected for safely handling the loads applied to the cable. For example, the cables can be provided by non-rotating 5/16 inch steel cable. Such cable can be obtained from the West Florida Wire and Rope company. The cables 18 are connected between the carriage 14 and the winch 10, with a first end 22a of the first cable 18a and a first end 22b of the second cable 18b connected to the carriage 14, and a second end 24a of the first cable 18a and a second end 24b of the second cable 18b connected to the carriage 14. Thus, the cables 18 are connected directly to the carriage 14 without intermediate sections of bungee cords, as is common in the prior art.

The cables 18 can be routed around upper support members such as upper pulleys 26a and 26b (collectively the "upper pulleys 26") and lower support members such as lower pulleys 28a and 28b (collectively the "lower pulleys 28"), each coupled to one the towers 16. Also, the cables 18 can be routed between the lower support members and guide support members such as guide pulleys 30a and 30b (collectively the "guide pulleys 30"), each coupled to one the towers 16. The pulleys can be provided by high-speed pulleys made of hard plastic, nylon, metal, composite, or other materials selected for strength and durability. The upper and guide pulleys 26 and 30 cooperate to hold the cables 18 between them when the carriage 14 travels above the towers (see FIG. 6B). Also, the pulleys can be mounted to the towers so as to permit the pulleys to move from side to side during the oscillatory motion of the carriage. For example, the towers 16 can have swivel couplings 29a and 29b similar to those used on swiveling chairs or in the crane industry.

The carriage 14 is secured in place by a releaseable carriage lock system 32 having a holding magnet as is used for lifting in junkyards. When the holding magnet is de-energized, the carriage is released and, under the force of the charged winch, launched into motion. Such a holding magnet can be obtained from the Jobmaster Magnets Company of Randallstown, Md. Alternatively or additionally, the lock 32 can be provided by a spring-loaded pin that is retracted by a hydraulic or pneumatic ram, a lever and fulcrum, an electronic cylinder, or by another mechanical or electronic device. Also, it will be understood that the lock 32 can be provided by a latch, pawl, pin, rod, finger, lifting or other magnet, or another mechanical linkage or mechanism, or a combination of any of the above-described locks, to provide redundant locks for safety considerations and requirements.

The lock 32 releasably couples the carriage 14 to a platform or other portion of the winch 10, to a freestanding platform independent of the winch, to an anchor, or to another structure. For example, an enclosure 33 can be provided for housing some or all of the components of the winch, which has a top or other surface that doubles as a platform for loading passengers into the carriage. Alternatively, the lock can releasably secure in place the cables, or a drum, axle, elastic member, tether, or second attachment member (as described below).

Upon releasing the carriage lock 32 while the winch 10 is in a charged state (as described below), the carriage 14 is launched along the launch ramp 20. The length, shape, and position of the ramp 20 can be selected to create a variety of rides. For example, as shown in FIG. 3, the ramp 20 can be provided with a curvature for launching the carriage 14 into a looping or spiral trajectory such as that shown by the broken line. Also, the carriage 14 can be movably mounted to the ramp 20 by a race member such as a roller mechanism, a lubricated bearing, or the like, that is guided by a raised or recessed track 21, so that the carriage 14 is released from the ramp at a predetermined place or time to launch the carriage into a predetermined trajectory. Of course, other guide mechanisms known in the art can be suitably employed.

In a first alternative arrangement shown in FIG. 4, the winch 10a can be used with a ramp 20a forming a closed loop such as a circle or oval, and supported by lower members and/or upper members (not shown). Additionally, the ramp 20a can include a first release ramp 21a and/or a second release ramp 21b, at which the carriage 14a is released from the ramp and follows the trajectory shown by the broken line.

Figure 5:
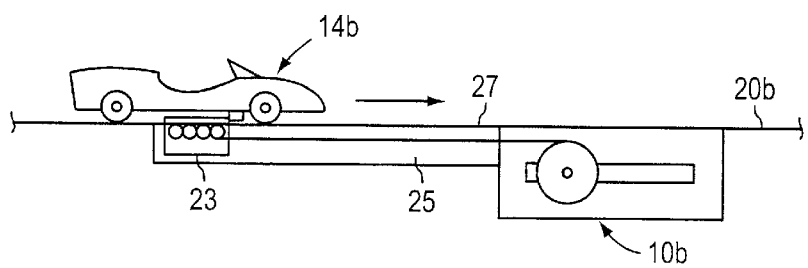
FIG. 5 is a side elevation view of the winch with an amusement ride in the form of a drag race ride, showing the winch coupled to and driving the carriage.

In a second alternative arrangement shown in FIG. 5, the winch 10b can be used with a drag race amusement ride with a carriage 14b that is launched along a ramp 20b. The carriage 14b can have the shape of an automobile, dragster, motorcycle, spaceship, rocket, or another vehicle or the like. A guide mechanism has a race member 23 that travels in a track 25 and is connected to the winch by the cable 27, similarly to the exemplary embodiment described above. When the car 14b is released with the winch charged, the car 14b is launched down the ramp 20b. It will be understood that in other embodiments the ramp can have one or more linear, arcuate, sinusoidal, corkscrew, or other regular or irregular shaped sections, two or another number of ramps can be provided, no ramps can be provided, or the ramp can be configured so as to brake or slow the carriage, as may be desired to cause a particular motion and path of the carriage.

Figure 5A:
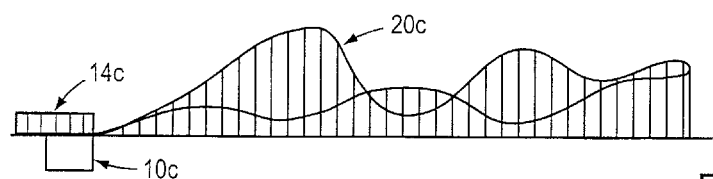
FIG. 5A is a side elevation view of the winch with an amusement ride in the form of a traditional roller coaster with a carriage.
Figure 5B:
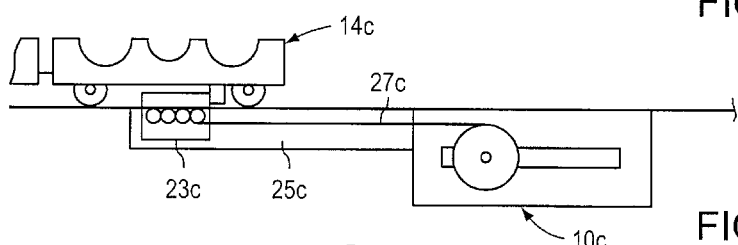
FIG. 5B is a side elevation detail view of the winch with the roller coaster of FIG. 5A, showing the winch coupled to and driving the carriage.

In a third alternative arrangement shown in FIGS. 5A and 5B, the winch 10c can be used with a roller coaster ride having a series of carriages 14c provided by conventional roller coaster cars coupled together that are launched along a ramp 20c such as a conventional roller coaster track. A guide mechanism has a race member 23c that travels in a track 25c and is connected to the winch by the cable 27c, similarly to those described above. When the carriages 14c are released with the winch charged, the carriages 14c are launched up the ramp 20c and around the closed circuit of track.

Figure 5C:
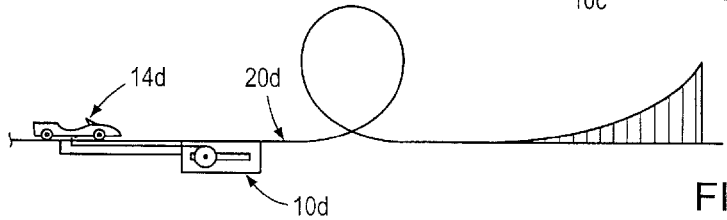
FIG. 5C is a side elevation view of the winch with an alternative roller coaster having a ramp with a loop.

In a fourth alternative arrangement shown in FIG. 5C, the winch 10d can be used with an amusement ride having a carriage 14*d* that is launched along a ramp 20*d* with a loop and an elevated distal for stopping the carriage and allowing it to return. The ramp 20*d* can be configured so that the carriage travels back-and-forth along the same section of the ramp (as shown), or configured as a closed circuit. A guide mechanism is connected to the winch by the cable 27*d*, similarly to those described above. When the carriage 14*d* is released with the winch charged, the carriage 14*d* is launched along the ramp 20*d*, through the looped section, up the elevated distal end until the carriage stops, back down the elevated distal end under the force of gravity, back through the looped section, and back to the start position.

Figure 5D:
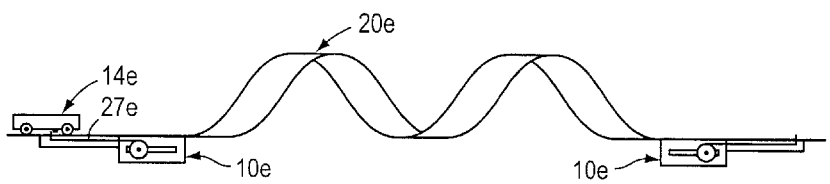
FIG. 5D is a side elevation view of the winch with an alternative roller coaster having a corkscrew-shaped ramp.

In a fifth alternative arrangement shown in FIG. 5D, two winches 10*e* can be used with an amusement ride having a carriage 14*e* that is launched along a ramp 20*e* with a corkscrew section. The ramp 20*e* can be configured so that the carriage travels back-and-forth along the same section of the ramp as shown (as shown), or configured as a closed circuit. A guide mechanism is connected to the winch by the cable 27*e*, similarly to those described above. When the carriage 14*e* is released with the first winch charged, the carriage 14*e* is launched along the ramp 20*e*, through the corkscrew section, and into engagement with the second winch 10*e* disposed at the second end of the ramp 20*e*. The second winch then functions to dampen and stop the motion of the carriage 14*e*, thereby charging and storing energy in the winch. The charged second winch can then be used to launch the carriage back through the corkscrew section into engagement with the first winch, and the cycle repeated as desired.

Figure 5E:
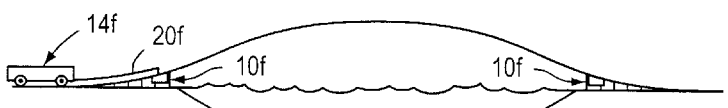
FIG. 5E is a side elevation view of the winch with an amusement ride in the form of a people-mover ride with an elevated ramp.
Figure 5F:
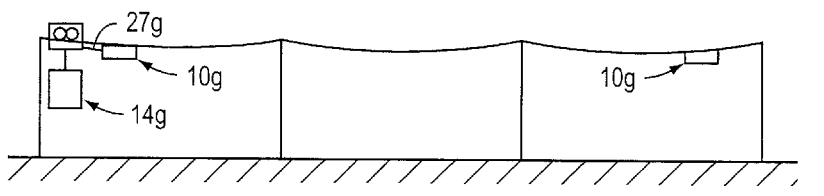
FIG. 5F is a side elevation view of the winch with an amusement ride in the form of a people-mover ride with an elevated ramp provided by an elevated cable and the carriage suspended from the cable.

A sixth alternative arrangement shown in FIG. 5E is similar to the fifth alternative arrangement, except that an elevated intermediate section is provided instead of the corkscrew section. The carriage 14*f* is launched up the elevated intermediate section of the ramp 20*f*, slowing but not stopping the carriage, and then down the intermediate section into engagement with the second winch. A seventh alternative arrangement shown in FIG. 5F is similar to the fifth alternative arrangement, except that the ramp is provided by a generally linear elevated cable or track. The sixth and seventh alternative arrangements are well suited for use in transporting persons or objects over distances, similar to conventional elevated cable systems used in amusement parks and on ski mountains.

Figure 6A:
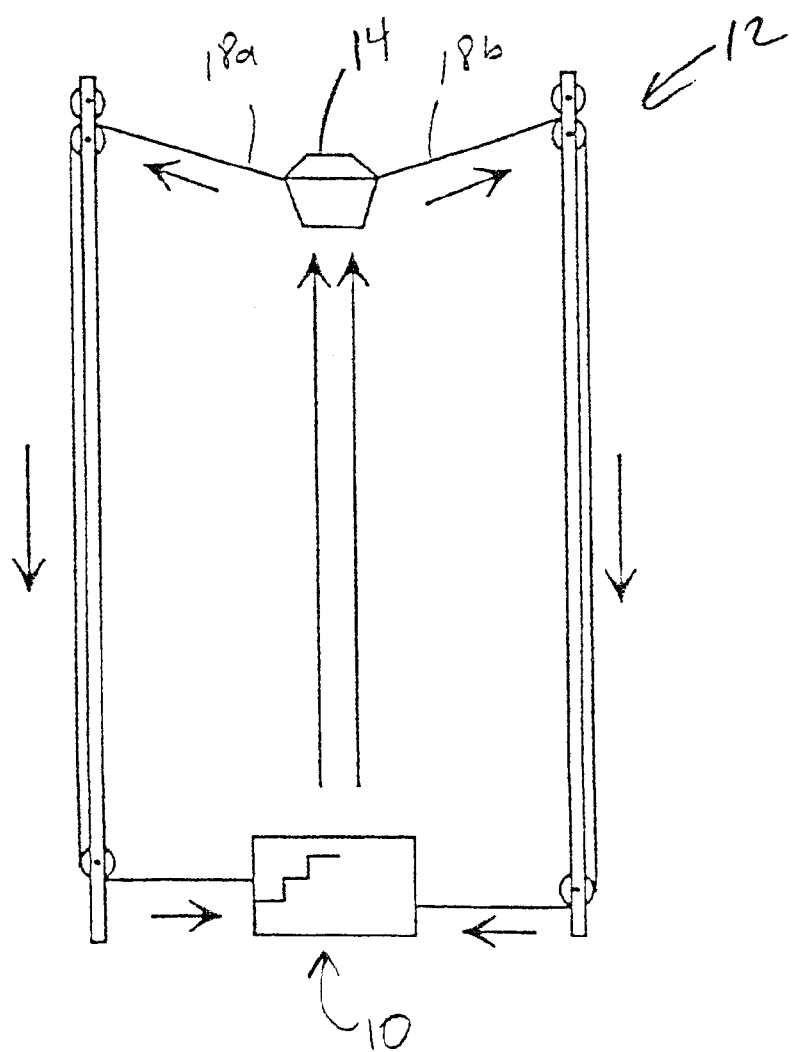
FIG. 6A is a front elevation view of the exemplary winch and vertical accelerator ride of FIG. 1, showing the carriage just after it has been launched.

Referring now to FIGS. 6A–6E, there is illustrated the oscillatory motion of the carriage 14 of the vertical accelerator ride 12 of the exemplary embodiment resulting from the operation of the winch 10. Initially, the carriage 14 is in the "loading" position and locked to a platform or other structure, as described above with reference to FIG. 1. In FIG. 6A, the carriage 14 has been released by the lock and launched upward by the charged winch 10 rapidly winding in the cables 18. At this position, all or much of the length of the cables 18 has been taken in by the winch 10, and the winch is discharged or substantially discharged. In FIG. 6B, the carriage 14 has traveled past the tops of the towers 16, and is thereby unwinding the cables 18 from and recharging the winch 10. In this manner, recharging the winch 10 causes the carriage 14 to slow down, thereby acting as a braking and dampening mechanism for smoothening out the ride.

The carriage 14 then reaches a maximum altitude and begins to fall back downward. In FIG. 6C, under the force of gravity and due to the discharging of the winch, the carriage has traveled back down to a position at about the tops of the towers. At this position, much of the length of the cables 18 has been taken back in by the winch 10, and the winch can be substantially discharged. In FIG. 6D, the carriage 14 has continued downward, unwinding the cables and recharging the winch 10 in the process. The carriage 14 then reaches a lower end of its oscillating travel path, and begins to move back upward, as shown in FIG. 6E, continuing this cycle of motion until the winch is fully discharged. The carriage 14 can then be lowered back down to the "load" position, unloaded of passengers, and reloaded for another turn.

Turning now to the components of the winch 10, as shown in FIGS. 7 and 8, the winch comprises two base members 34*a* and 34*b*, and an energy storage mechanism 36 mounted to the base members or another component of the winch. The energy storage mechanism can have one or a plurality of elastic members 44, arranged in a row or an array. The elastic members 44 can be provided by extension springs of the type that are readily obtainable from garage door manufacturers and spring suppliers. Such springs can be obtained from the Wire Spring Company of Pittsburgh, Pa. Alternatively, the elastic members 44 can be provided by coil springs, cords or belts made of an elastic material such as bungee cords or rubber belts, or other spring mechanisms or members having an elasticity. The number, length, and strength (i.e., the spring factor) of the elastic members are selected based on the force desired to be transmitted to the carriage through the cables 18. For example, stronger springs can be selected to launch the carriage with greater acceleration and over a longer time or distance of acceleration.

The elastic members 44 can be connected between a first attachment member 40 and a second attachment member 42 by conventional fasteners. The attachment members can be provided by bars, rods, pipes, plates, or the like, made of a metal or other suitably strong material. The elastic members can be connected to the attachment members by drilling or otherwise forming holes in the attachment members, fitting cable thimbles on the ends of the springs, routing the spring ends through the holes and bending the ends back in a loop, and securing the spring ends to the spring by fasteners such as U-shaped or other cable clamps, bolts, spelter sockets, welds, or other known fasteners.

The first attachment member 40 is moved by two or another number of actuators 38*a* and 38*b*, while the second attachment member 42 is not free to move, thereby charging and storing energy in the elastic members 44. For example, two actuators 38*a* and 38*b* can be connected between the first attachment member 40 and the base members 34*a* and 34*b* to push the first attachment member away from the base members. Alternatively, two actuators 38*a* and 38*b* can be connected to the first attachment member 40 to pull the first attachment member away from the base members. In another embodiment, a rotary actuator rotates to push, pull, or otherwise wind in the elastic members. The number, length of travel, and power of the actuators are selected based on the power desired to be transmitted to the carriage through the cables 18. For example, the actuators can be selected with longer travel and more power to launch the carriage with greater acceleration and over a longer time or distance of acceleration. Of course, only one or more than two actuators can be suitably employed, and the elastic members can be connected directly to the actuators, as may be desired.

The actuators 38*a* and 38*b* can be provided by hydraulic rams of the type that are used on construction cranes to raise and lower their booms and that can be purchased from most hydraulic suppliers. The hydraulic rams can be selected with a travel to stretch the elastic members 44 a specific distance, for example, ten feet. Also, the rams can be selected with a specific lifting capability, for example, 100,000 pounds or more. The rams can further include safety check valves so that if a system failure occurred the rams would not suddenly collapse or contract. A bleeder valve can be used to lower the rams. Such hydraulic rams can be obtained from the Bearendsen Fluid Power company. Alternatively or alternatively, the actuators can be provided by other hydraulic cylinders, pneumatic cylinders, other linearly extendable mechanisms, rotary actuators, gear trains, conventional winches, pulleys, weights, counterweights, or other mechanisms for extending and charging the elastic members 44.

One or a plurality of tethers are provided that wind out from the axle 46 in response to the upward (or other direction of) pull of the discharging elastic members 44 when the carriage is released, and that wind in about the axle to pull down (or another direction) and recharge the elastic members in response to the motion of the launched carriage. The tethers 48 can be connected to the second attachment member 42 by conventional fasteners and wound about an axle 46. For example, the tethers 48 can be connected to the axle 46 by two welded-on cable clamps commonly used in the cable industry, and to the second attachment member 42 in the same manner that the elastic members 44 are attached thereto. Alternatively, the tethers 48 can be connected to the axle 46 and/or to the second attachment member 42 by screw-in clamps, by being threaded into the axle or attachment member and screwed down tight, or by bolts, spelter sockets, welds, or other fastening structures.

Where a plurality of tethers 48 are provided, they can be arranged in a row or an array. Alternatively, the tethers 48 can be connected to the elastic members 44 directly, in a one-to-one, two-to-one, or other ratio. Furthermore, the tethers 48 and/or elastic members 44 can be attached in groups to the attachment members so as not to exert too much force on any one tether or elastic member, to provide the desired safety or dampening effect or to match the winding capabilities of the axle and drums. The tethers 48 can be provided by wire rope, for example, ¼ inch cable, which can be obtained from the West Florida Wire and Rope company. Alternatively, the tethers 48 can be provided by one or multiple belts as are commonly used in the mining and lifting industries, or other tether structures known in the art.

The axle 46 rotates to wind in or out the tethers 48, and as such is rotationally coupled by conventional bearings or the like to the base members 34a and 34b, or to another component of the winch. Such bearings can be obtained from Motion Industries, Inc. of Birmingham, Ala. The axle 46 can be made of heavy gauge pipe or tube, or of solid steel or another metal, or another material and structure selected for strength, as may be desired in a given application.

The axle 46 has a winding surface 50 about which the tethers are windable and unwindable. For example, the axle 46 can have an outside diameter of about six inches, with the tethers wound around the axle about ten times. Where desired, the axle winding surface 50 can have a plurality of grooves 54 machined or otherwise formed therein in a coiled, side-by-side configuration, for receiving and directing the winding in and out of the tethers 48 along the axle (see FIG. 8). Alternatively, one groove can be formed in the axle for winding in and out the tethers in a spiral, layered arrangement, or in another arrangement.

Two or another number o, f drums are coupled to the axle 46 so that the drums rotate with the axle 46. For example, two drums 56a and 56b can be attached to the ends of the axle 46 by bolts, or, alternatively, one or another number of drums can be provided, the drums can be positioned at an intermediate or other segment of the axle, and/or the drums can be attached to the axle by other fasteners or connectors. The ends of the cables 18 can be attached to the drums by conventional fasteners. For example, holes can be drilled in the drums and the cable ends inserted into the holes, and copper duplex ferrules can be clamped on for additional safety and to practically eliminate the possibility of the cable pulling loose from the drum. The drums 56a and 56b can be made of aluminum or another material selected for high strength and low weight down so that a minimum energy loss occurs when they rotate. Such drums can be obtained from the Keeler Ironworks company.

Each of the drums has a winding surface 58 about which the cables 18 are windable and unwindable. Where desired, the drum winding surfaces 58 can have a groove 62 machined or otherwise formed therein. Each drum can have one groove for every cable being used, so each drum may have more than one groove where more than one cables are used. Each groove can be formed in the corresponding drum for receiving and directing the winding in and out of the cables 18 in a spiral, layered arrangement (see FIGS. 10A and 21). In this manner, the cables wind in on top of the section of cable wound in by the preceding turn of the drums. Alternatively, a plurality of grooves can be formed in the axle for winding in and out the cables in a coiled, side-by-side configuration (see FIG. 8) or another configuration.

The drum surfaces 58 have a diameter 60 that is greater than a diameter 52 of the axle surface 50 to provide a mechanical advantage when winding and unwinding the cables 18 to move the carriage. Thus, the ratio of the diameters 52 and 60 is selected to provide a gear reduction ratio for producing a desired wind-in and wind-out speed of the cable and thereby producing a desired acceleration of the carriage. For example, the drums 58 can have a diameter 60 of about ten feet and the axle 46 can have a diameter 52 of about six inches, so that for every foot of tether 48 wound out from the axle, the drums wind in about twenty feet of cable 18. Accordingly, about 188 feet of cable can be wound in by about six revolutions of the drums 56 and axles 46, which can be caused by operating the actuators to stretch the elastic members by less than ten feet. In this arrangement, the winch 10 can operate to very rapidly wind the cable in about the drums to launch and accelerate the carriage to a very high velocity in a very short period of time, to produce the thrills expected of amusement ride passengers.

Figure 8A:
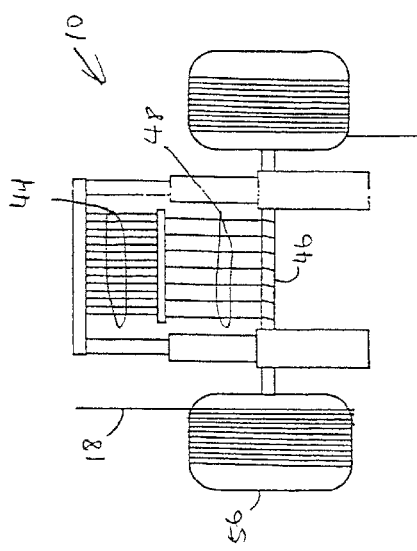
FIG. 8A is a side elevation view of the winch of FIG. 1, showing the elastic members being charged.

Referring to FIGS. 8A–8D, there is illustrated the operation of the winch 10 in launching and inducing an oscillatory motion of the carriage. In FIG. 8A, the actuators 38a and 38b are extended (as shown by the arrows), while the carriage is secured in a fixed position by the lock, to charge and store energy in the elastic members 44. The winch in FIG. 8A corresponds to the carriage in FIG. 1, after the passengers have been loaded into the carriage for the ride.

Figure 8B:
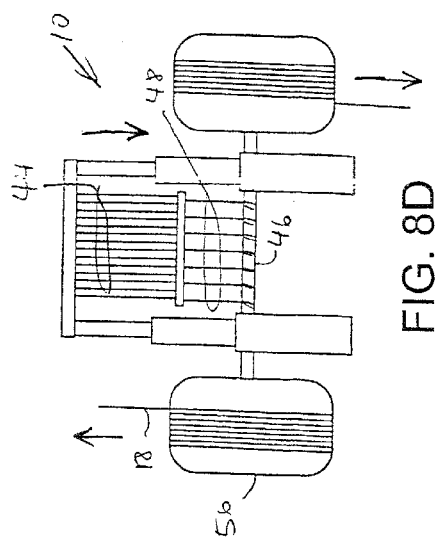
FIG. 8B is a side elevation view of the winch of FIG. 8A, showing the elastic members pulling the tethers to wind in the cables about the drums.

In FIG. 8B, the tethers 48 rapidly wind out from the axle 46 in response to the upward pull of the discharging elastic members 44 (as shown by one arrow), when the carriage is released by unlocking the lock. As the tethers 48 unwind from the axle 46, the axle and drums 56 are caused to rotate, thereby winding in the cables 18 about the drums (as shown by the other arrows) and launching the carriage. Because the diameter of the drums is greater than the diameter of the axle, a mechanical advantage is achieved which causes the carriage to be launched with great acceleration. The winch in FIG. 8B corresponds to the carriage in FIG. 6A.

Figure 8C:
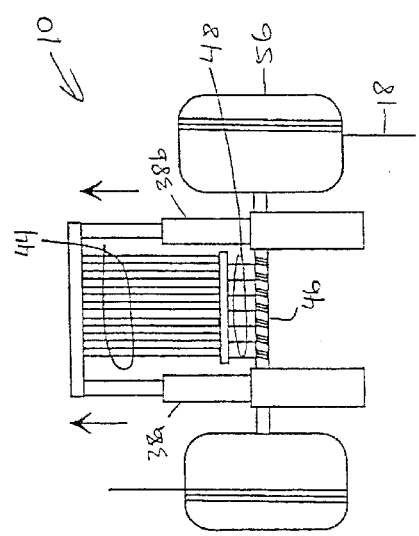
FIG. 8C is a side elevation view of the winch of FIG. 8A, showing the elastic members discharged and the cables in a fully wound in position.

In FIG. 8C, the elastic members 44 have been returned to their normal unstretched state, and they are now substantially discharged. This discharge state occurs before the carriage reaches the tops of the towers, or later where a clutch or other disengagement mechanism is provided.

Figure 8D:
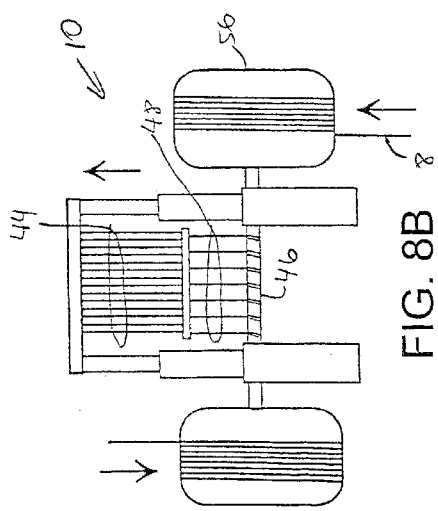
FIG. 8D is a side elevation view of the winch of FIG. 8A, showing elastic members being charged by unwinding the cables from the drums.

In FIG. 8D, the elastic members 44 are recharged as the cables 18 are wound back out and, accordingly, the tethers 48 are wound back in, as the carriage continues its upward trajectory after passing the tops of the towers. In this manner, the restretching of the elastic members induces a braking and dampening effect on the carriage. The winch in FIG. 8D corresponds to the carriage in or just before the position of FIG. 6B. The winch continues to be recharged and discharged as the carriage oscillates up and down (see FIGS. 6C–6E), further braking and dampening the motion of the carriage until the carriage reaches an equilibrium state after fully expending the energy stored in the elastic members.

Figure 9A:
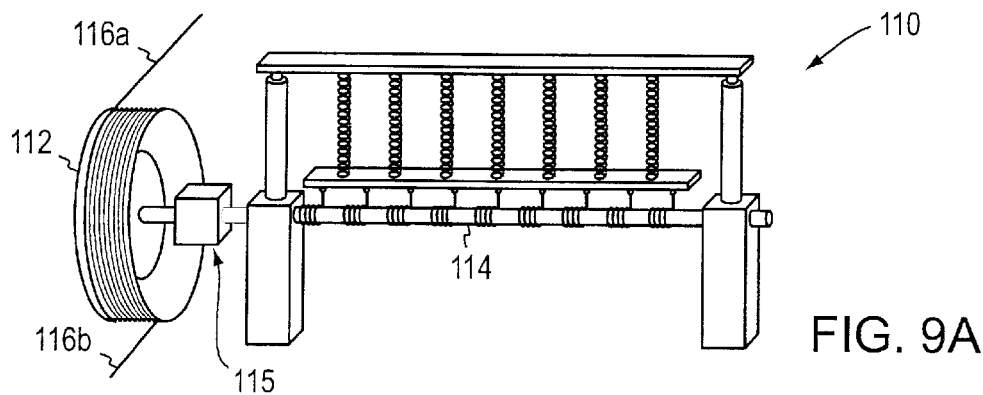
FIG. 9A is a perspective view of an alternative winch of the present invention having two cables wound on one drum.
Figure 9B:
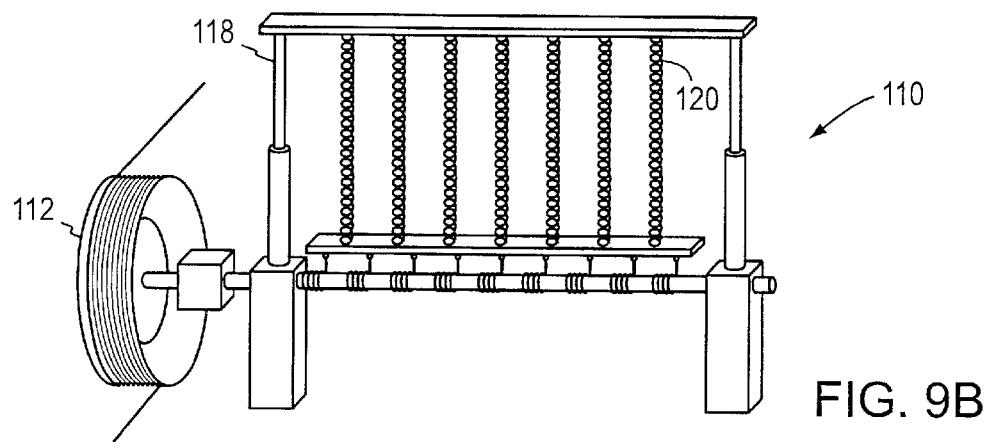
FIG. 9B is a perspective view of the alternative winch of FIG. 9A, showing the elastic members being charged.
Figure 9C:
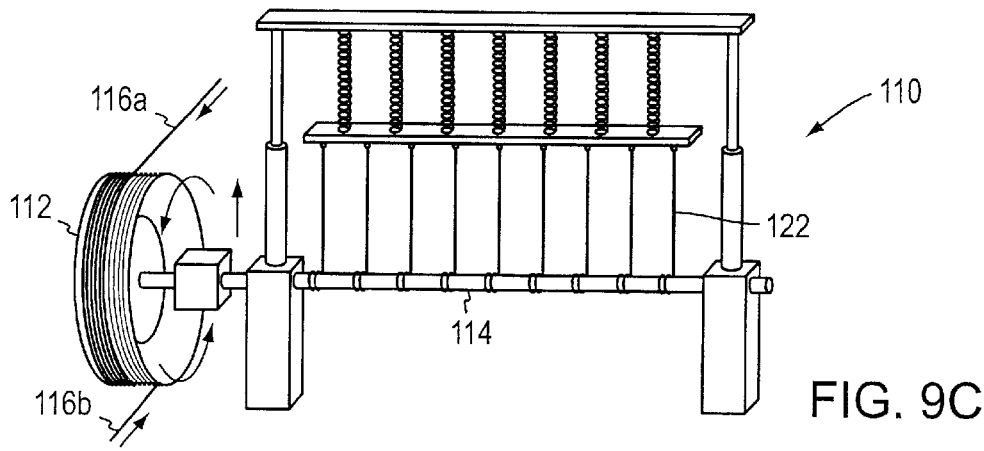
FIG. 9C is a perspective view of the alternative winch of FIG. 9A, showing the elastic members pulling the tethers to wind in the cables about the drum.

Referring now to FIGS. 9A–9C, there is illustrated an alternative embodiment of the winch, referred to generally as 110. As shown in FIG. 9A, the winch 110 is similar to the exemplary embodiment 10 described above, except that only one drum 112 is connected to the axle 114, with the drum having two cables 116a and 116b that are simultaneously wound in and out thereabout. As shown in FIG. 9B, as the actuators 118 are extended, the drum 112 does not rotate, so that a charge is stored in the elastic members 120. As shown in FIG. 9C, when the carriage is released, the tethers 122 are urged upward thereby rotating the drum 112 to simultaneously wind in both the cables 116a and 116b (as shown by the arrows), so that the carriage is launched into motion. The winch 110 then operates to brake and dampen the motion of the carriage, as described above.

Additionally or alternatively, a gearbox 115 can be coupled between the drums 56 and the axle 46, for producing a further gear reduction. The gearbox 115 can be of a commercially available type selected to provide the desired number of revolutions of the drum for each revolution of the axle. Also, an automatic transmission can be operably coupled to the gearbox to change the gearing in response to the rotational speed of the drums and axles.

In other forms of the invention, multiple winches are provided for launching a single carriage of a single amusement ride, a single winch is provided for launching multiple carriages of a single amusement ride, multiple winches are provided for launching multiple carriages of a single or multiple amusement rides, or other combinations of winches and carriages can be provided. Also, the drum or drums can be disposed at the ends of the axle or interposed between the elastic members, or multiple axles each with one or more drums can be coupled to the energy storage mechanism. Additionally, the winch and variations thereof can be used with handheld or fixed mechanisms for launching projectiles such as arrows, darts, BB's, bullets, balls, model airplanes, and so forth, or for operating gates, shutters, valves, and so forth. The winch and variations thereof also can be used with other amusement rides for inducing abject fear in willing participants, or with other devices that launch an animate or inanimate object. Additionally, a clutch or other disengagement mechanism can be coupled to the drums, the axle, or another component of the winch, so that the drums can reverse direction between winding in and winding out of the cables or so that the axle can reverse direction between winding in and winding out of the tethers.

Figure 10:
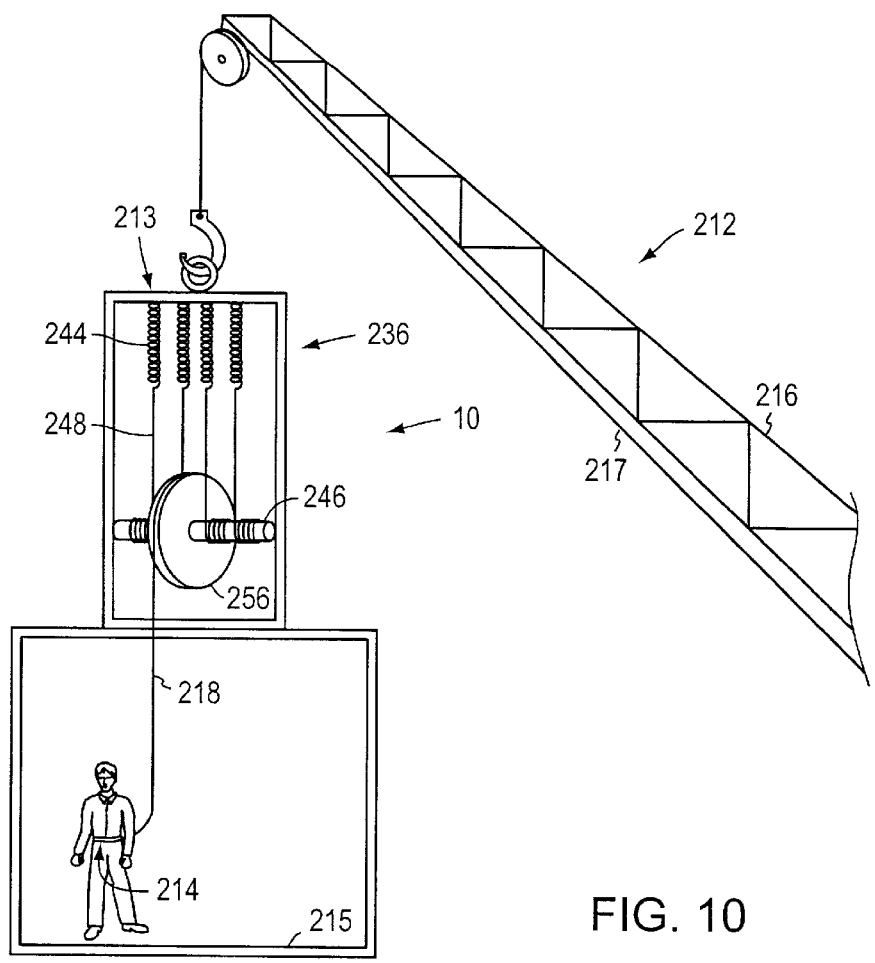
FIG. 10 is a side elevation view of an alternative form of the winch with an amusement ride in the form of a bungee jump having a launch frame coupled to a tower.

In a seventh alternative arrangement shown in FIG. 10, the winch 210 is used with an amusement ride in the form of a bungee jump 212. The carriage is provided by a passenger harness 214 that the rider wears and that is connected to one or more of the cables 218 (instead of bungee cords, as is the common practice), and the tower is provided by the boom arm 216 of a crane. The ride 212 includes a launch frame 213 with a launch platform 215 where a person may stand or sit and jump therefrom, with the launch frame coupled to an upper section of the tower 216. For example, the launch frame 213 can be coupled to the boom 216 by a hoisting cable 217 that permits the launch frame to be moved between a lowered position and an elevated position. The winch 210 can be mounted to the launch frame as shown, mounted on the ground with the cable routed around a pulley or the like on the upper section of the tower, mounted on the crane with the cable routed around a pulley or the like on the upper section of the crane boom, or positioned elsewhere.

Similar to the embodiments described above, the winch 210 includes an energy storage mechanism 236 having one or more elastic members 244 (for example, connected to a first attachment member of the launch frame), one or more tethers 248 connected to the elastic members (directly, via a second attachment member, or otherwise), an axle 246 that winds in and out the tethers 248, and a drum 256 connected to the axle and that winds in and out the cable 218. More than one drum can be provided, as may be desired in a given application. Also, the drum 256 can have one (or more) grooves defined therein so that the cable is wound thereabout in a spiral, layered arrangement (see FIG. 10A). It will be understood that the various forms of these components described above can be similarly employed in this form of the invention.

Figures 11, 12:
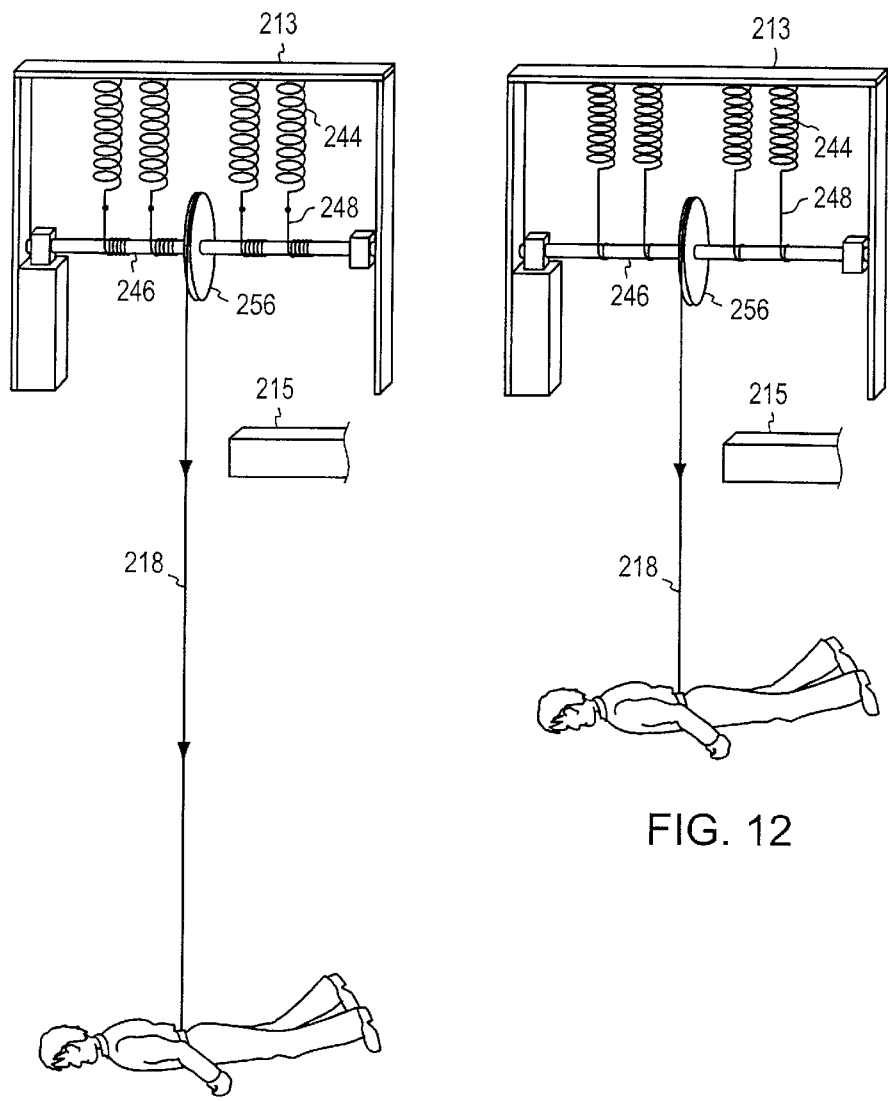
FIG. 11 is a side elevation view of the winch and bungee jump ride of FIG. 10, showing a jumper unwinding the cable from the drum to wind in the tethers about the axle and stretch the elastic members.
FIG. 12 is a side elevation view of the winch and bungee jump ride of FIG. 10, showing the elastic members contracting to wind out the tethers from the axle and wind the cable in about the drum.

FIGS. 11 and 12 show the operation of the winch 210 in this form, which is somewhat different from the operation of the previously described embodiments. As shown in FIG. 11, when a jumper leaps and falls downward from the platform 215, his or her weight pulling on the cable 218 causes the cable to unwind from the drum 256, which causes the tethers 248 to wind in about the axle 246, which in turn stretches and charges the elastic members 244. After the elastic members 244 reach their fully stretched length, the charged elastic members pull the rider back upwardly. Thus, as shown in FIG. 12, the charged elastic members 244 then contract to wind out the tethers 248 from the axle 246 and wind the cable 218 in about the drum 256, thereby discharging the elastic members. This motion is repeated so that the rider falls and is pulled back up in an oscillatory motion until the rider comes to a stop.

In this manner, the winch 210 provides a dampening effect on the oscillatory motion of the rider, but need not launch the rider into motion. It will be understood, then, that the weight of the falling rider is what charges the elastic members 244 of the energy storage mechanism 236, so that neither an actuator nor a lock is needed in this form of the winch 210.

Figure 13:
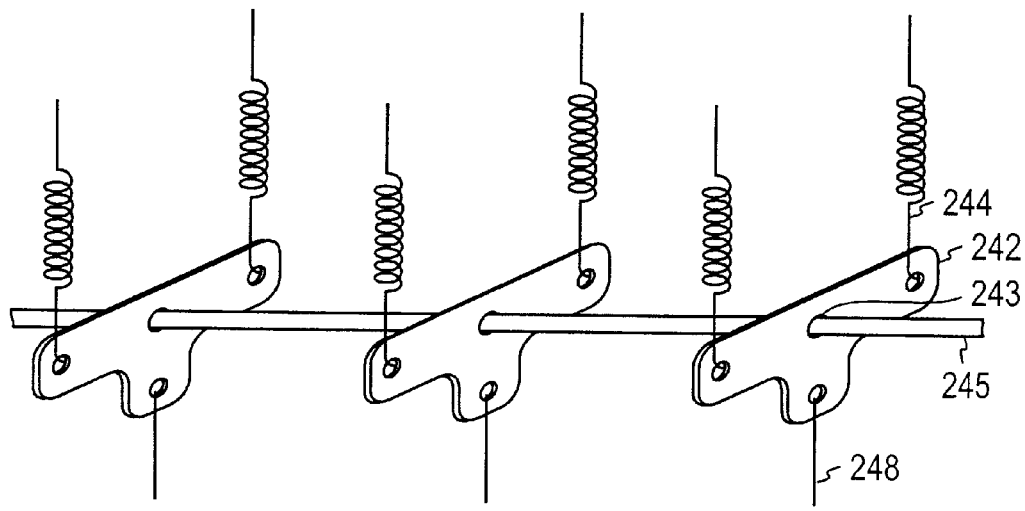
FIG. 13 is a perspective view of a portion of the winch, showing alternative attachment members with a safety cable.

The bungee jump shown in FIGS. 10–12 shows the elastic members 244 attached directly to the tethers 248. Alternatively, the elastic members 244 and tethers 248 can be interconnected by an attachment member such as that shown and described above. In another alternative form of the invention, as shown in FIG. 13, the attachment member can be provided by a plurality of plates 242. Each of the plates 242 has an opening 243 for receiving a safety member 245. The safety member 245 is provided by a flexible steel cable, although a bar, rod, pipe, or other structure made another material can be suitably employed. The ends of the safety cable can be connected to the base member, the launch frame, or elsewhere, with plenty of slack in the cable or with a movable connection such as being extended through a slot.

Accordingly, the safety member 245 can move up and down with the tethers 248. If one of the elastic members 244 were to somehow break, the safety member 245 will hold the plate 242 in place relative to the other plates, and thereby prevent the tether 248 from being uncontrollably wound in about the axle 246 and the elastic member from rapidly recoiling. Therefore, the main cable 218 will be prevented from being uncontrollably unwound from the drum 256 even if one of the elastic members or tethers should fail. This provides for enhanced safety of the riders. Of course, the elastic members can be connected to the frame or first attachment member in a similar fashion, as may be desired.

Although the opening 243 is shown as a hole, alternatively, it could be provided by a notch, groove, catch surface on an extension arm, or by another opening. Also, the elastic members 244 and tethers 248 can be connected to the plates 242 in a conventional manner. For example, the plates 242 can have holes 247 and 249 for connection of cable thimbles on the ends of the elastic members 244 and the tethers 248, respectively. The holes 243, 247 and 249 can be drilled, pressed, or otherwise formed in the plates 242, and sized to receive the safety member. For example, the safety member 245 can be provided by a ¾ inch cable, with the holes sized accordingly.

Figure 14:
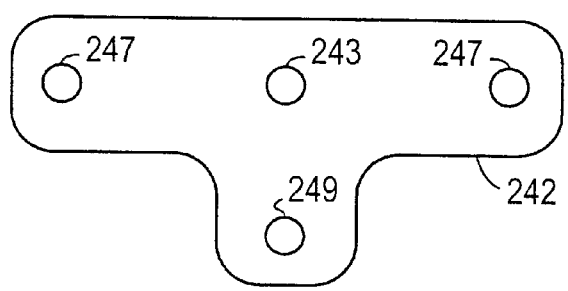
FIG. 14 is a side view of one of the attachment members of FIG. 13, for connecting two elastic members to one tether.

The plates 242 are made of steel or another material, and can be provided in various shapes, sizes, and hole configurations, depending on the application. Thus, the plate 242 can be generally T-shaped, triangular, or rectangular, or have another regular or irregular shape. The plates 242 can be configured with holes 247 and 249 for connecting two elastic members 244 to one tether 248 (see FIGS. 13 and 14), one elastic member 244 to two tethers 248 (see plate 242a in FIG. 15), two elastic members 244 to two tethers 248 (see plate 242b in FIG. 16), one elastic member 244 to one tether 248 (see plate 242c in FIG. 17), or with other hole configurations. More than one elastic member 244 can be connected to one (or more) tether 248 by providing additional holes 247, or by providing junction plates 251 (see FIG. 18) for connection to the plate 242. Such junction plates 251 can be made of one piece or formed by two pieces 251a and 251b, and can be made of steel or another material.

Figure 19:
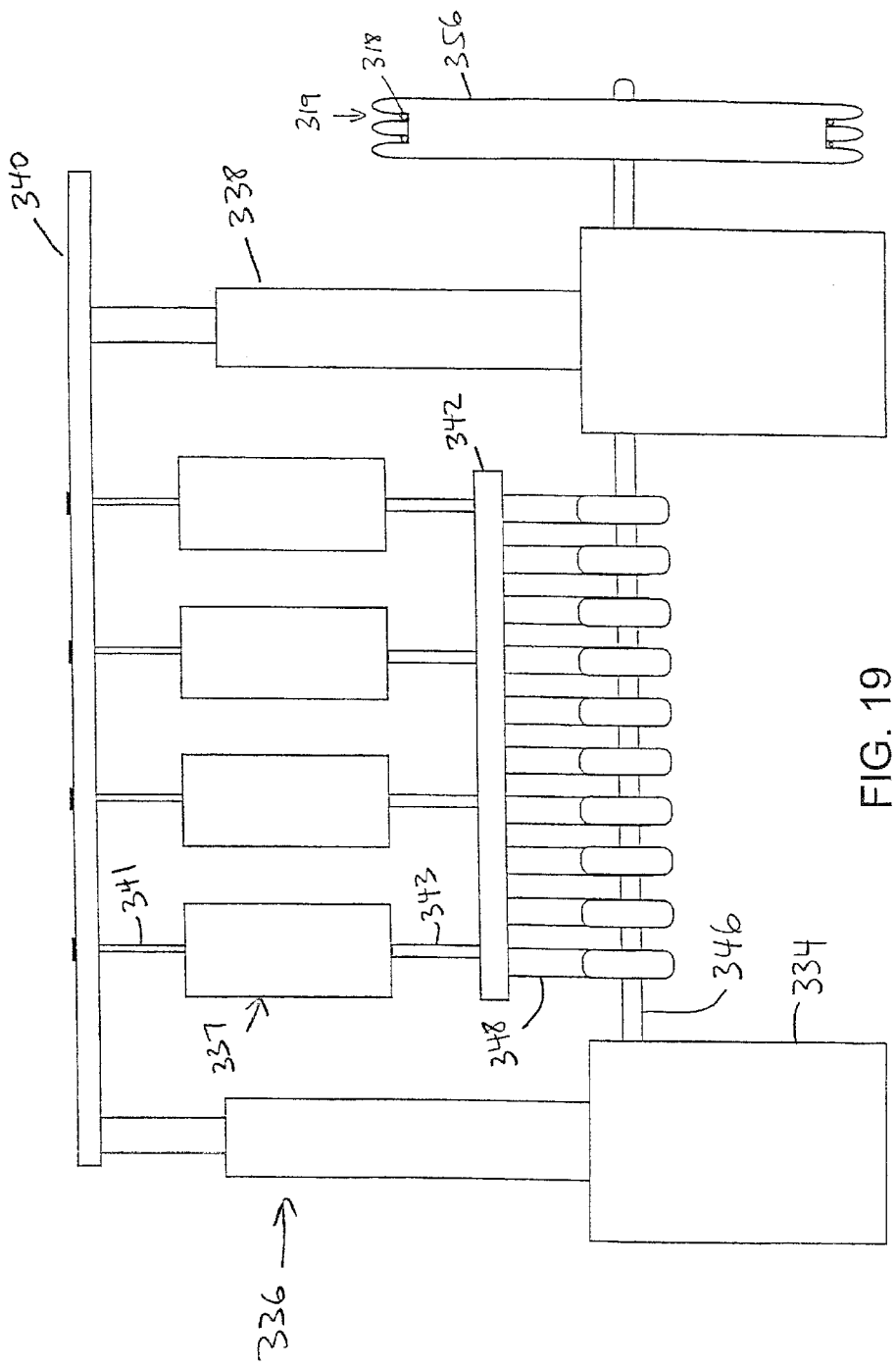
FIG. 19 is a side elevation view of an alternative form of the winch, showing the energy storage mechanism having telescopic spring devices.

An eighth alternative arrangement of the invention is shown in FIG. 19. Similar to the embodiments described above, this embodiment of the winch 310 includes an energy storage mechanism 336 having one or more elastic members 344 connected between first and second attachment members 340 and 342, one or more actuators 338 for separating the first and second attachment members 340 and 342, one or more tethers 348 connected to the second attachment member 342, an axle 346 that winds in and out the tethers 348, a drum 356 connected to the axle and that winds in and out the cable 318, and base members 334 that rotationally support the axle 346. It will be understood that the various forms of these components described above can be similarly employed in this form of the invention.

In this embodiment of the winch 310, the tethers 348 are provided by belts that wrap around the surface of the axle 348 and then on top of themselves in a spiral, layered configuration, instead of along the length thereof. The belts can be made of nylon or another material, with the number and material of the belts selected to provide the needed strength. Also, the belts can wind into a groove in the axle and/or guide plates can be provided on the axle at the sides of the belts for ensuring that the belts wind in on top of themselves. Because the belts wrap around on top of themselves, the more wraps of belt that are wound in, the larger the diameter of the then outer belt segment (compare FIG. 21). Thus, when beginning to wind out the belts 348 (see FIG. 19), the then outer belt segment is easier to wind in because the belt is curved about a larger diameter and thereby unwinds with a greater moment arm. This arrangement also produces less stress on the belt, thereby providing longer belt life.

Also, the belts 348 can be configured so that, when the elastic members are fully discharged, the belts are not fully wound out from the axle, so that at least a portion of the belt still overlaps with another portion thereof. This arrangement reduces the stress and strain on the connection of the tether 348 to the axle 346, for enhanced safety of the winch 310 and the amusement ride.

Additionally, the energy storage mechanism 336 has telescopic spring devices 337 connected to the first and second attachment members 340 and 342 by connection members 341 and 342. The connection members 341 and 342 can be provided by steel rods, or alternatively can be provided by pipes, shafts, bars, cables, or the like, made of another rigid or flexible material.

Figure 20:
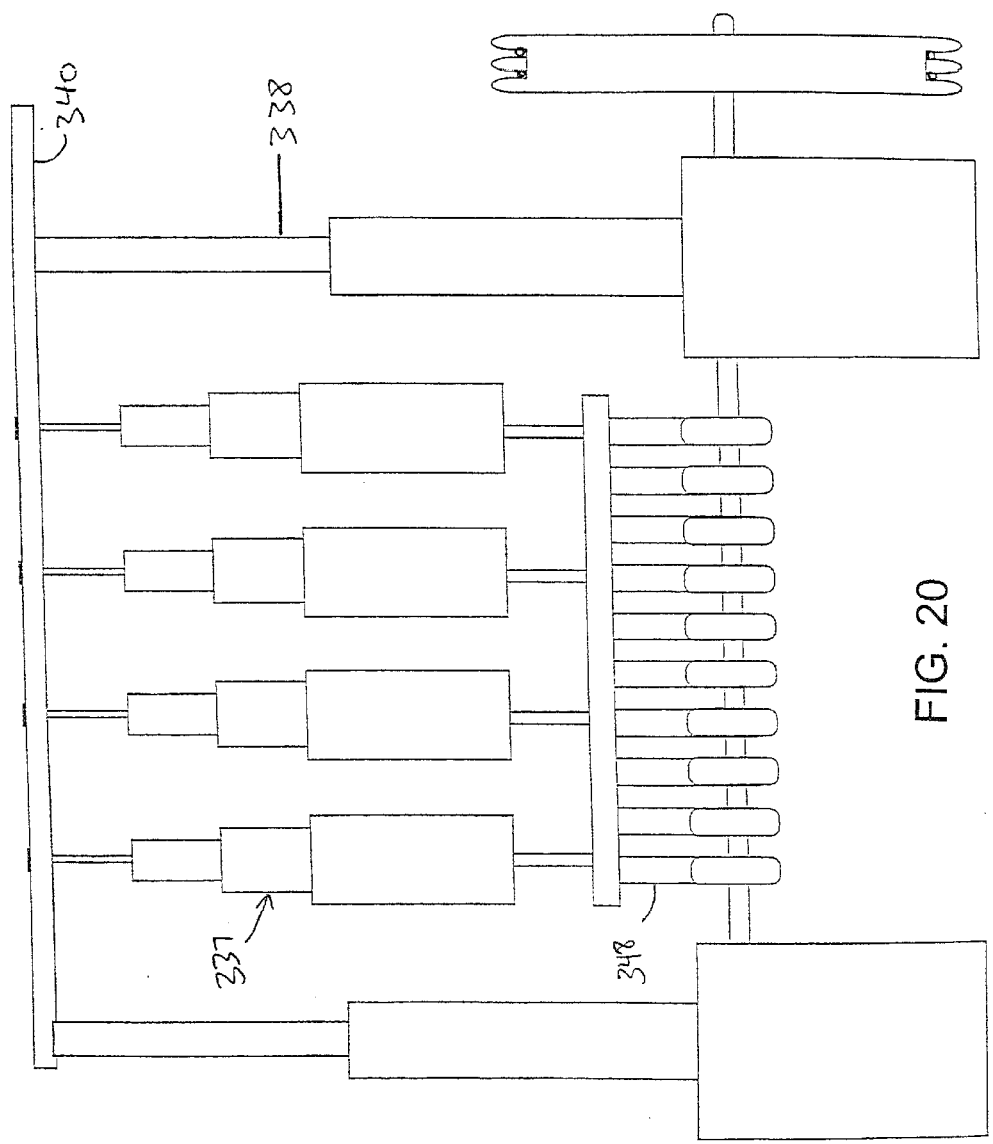
FIG. 20 is a side elevation view of the winch of FIG. 19 in operation, showing the telescopic spring devices being charged by operation of the actuators.
Figure 21:
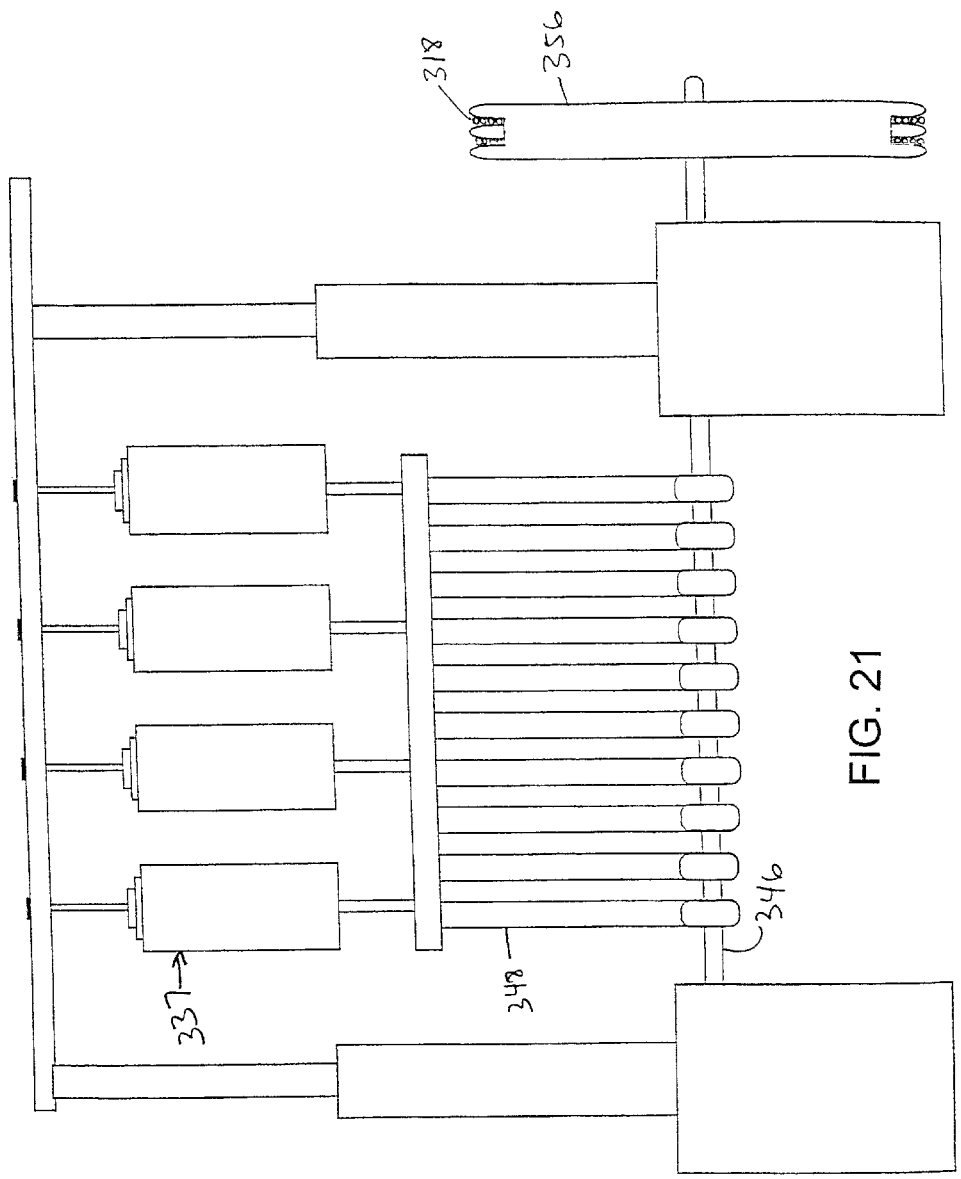
FIG. 21 is a side elevation view of the winch of FIG. 19 in operation, showing the telescopic spring devices being discharged to wind out the tethers and wind in the cable.

FIGS. 19–32 show the operation of the winch 310 with the telescopic spring devices 337. In FIG. 19, the telescopic spring devices 337 are in a neutral, uncharged state. In FIG. 20, the actuators 338 are operated to move the first attachment member 340 away from the second attachment member 342 while the tethers 348 are prevented from unwinding (for example, by the lock), thereby charging the telescopic spring devices 337 of the energy storage mechanism 336. In FIG. 21, the tethers 348 are released to unwind (for example, by releasing the lock), and the telescopic spring devices 337 discharge so as to unwind to tethers 348 from the axle 346. Accordingly, the rotating axle 346 rotates the drum 356 and winds in the cable 318 at a very rapid rate.

Figure 22:
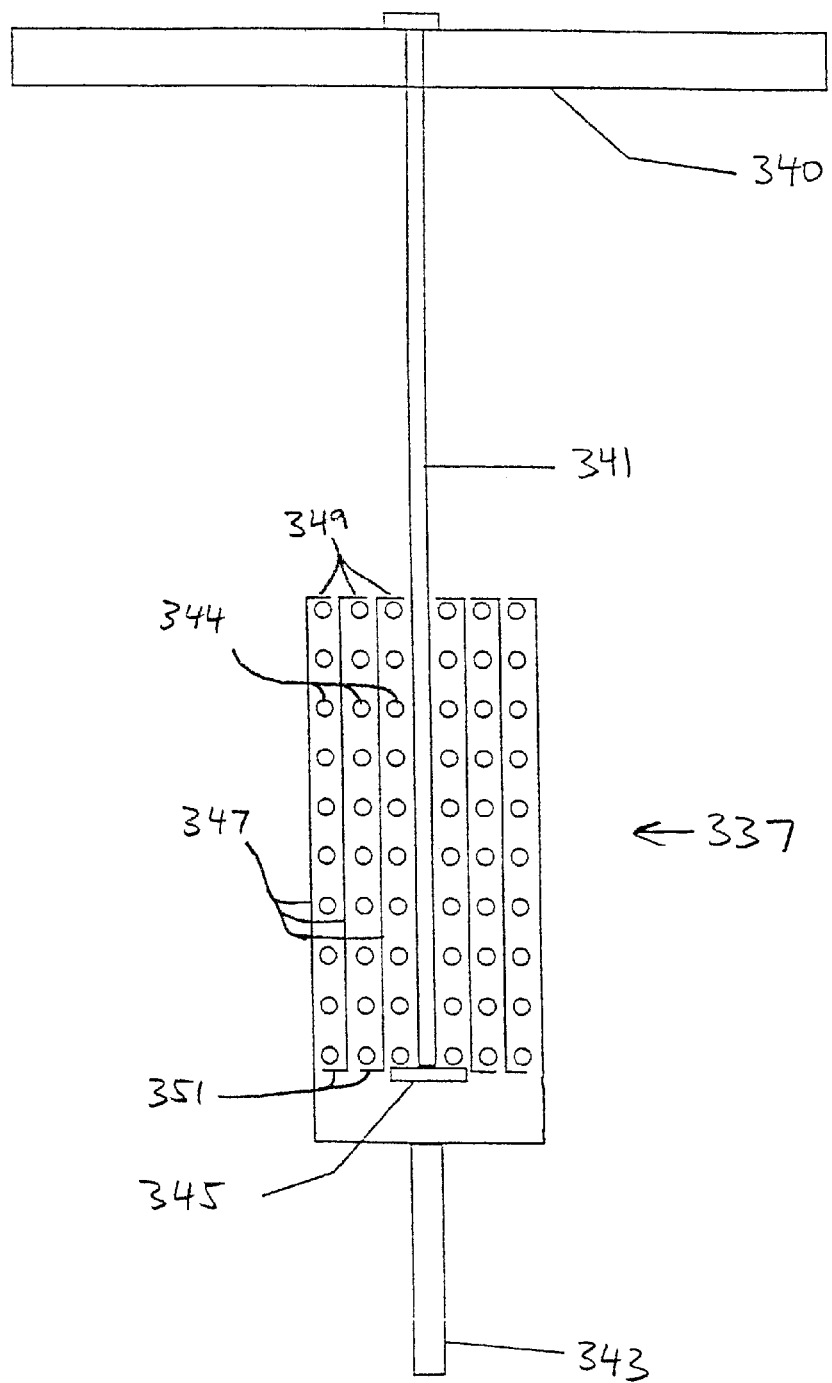
FIG. 22 is a side elevation view of one of the telescopic spring devices of FIG. 19, showing concentric coil springs disposed within concentric sleeves.

FIG. 22 shows a detail of one of the telescopic spring devices 337 with the elastic members provided by coil springs 344 concentrically arranged about the connection member 341. A plunger 345 is connected to the connection member 341 and engages an end of the inner coil spring. The telescopic spring devices 337 further have concentric sleeves 347 each having oppositely directed flanges 349 and 351 (for example, inward and outward) that are spaced apart (for example, at opposite ends of the sleeve) and that engage ends of the adjacent springs 344. Thus, one end of each spring 344 is engaged by the outward flange 351 of one of the sleeves (or by the plunger) and another end of each spring is engaged by the inward flange 349 of another one of the sleeves. While the device is shown with three springs 344 and sleeves 347, it will be understood that any number of concentric springs 344 and sleeves 347 can be provided to produce the spring force desired for a given application. Where more than one spring is provided, they can be selected with similar spring factors so that the load is distributed relatively evenly amongst the springs. Also, it will be understood that other elastic members can be used, such as leaf springs or other spring structures made of metal, an elastomer, or another material.

FIGS. 23–25 show the operation of one the telescopic spring devices 337. In FIG. 23, the telescopic spring devices 337 are in a neutral, uncharged state. In FIG. 24, when the actuators are operated to extend the first attachment member 340, the coil springs 344 are compressed by the plunger 345 and the flanges 349 and 351, thereby charging the springs of the energy storage mechanism. In FIG. 25, when the tethers 348 are released (for example, by releasing the lock), the springs 344 discharge thereby pulling the second connection member 343 (as shown by the arrows) and unwinding the tethers from the axle. Accordingly, the rotating axle rotates the drum and winds in the cable at a very rapid rate.

In this arrangement, the springs 344 are charged by compression thereof, so that even if one of the springs were to fail, the tether would not be uncontrollably unwound and the spring wound not rapidly recoil, thereby avoiding the possibility of a catastrophic failure. This provides a significant safety advantage over the known energy storage mechanisms of the prior art.

Figure 26:
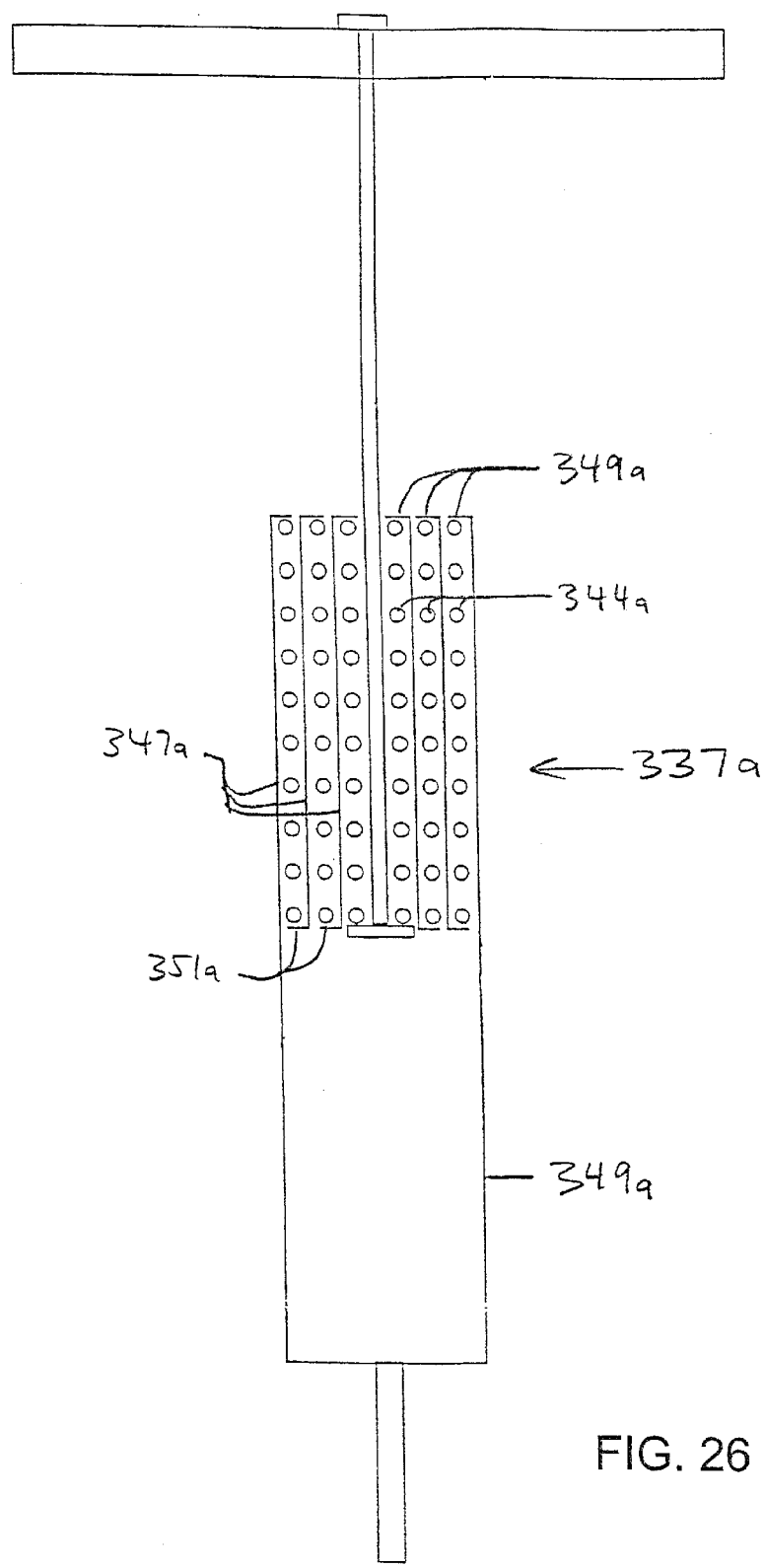
FIG. 26 is a side elevation view of an alternative telescopic spring device similar to that of FIG. 22, showing a further elongated outer concentric sleeve.

FIG. 26 shows an alternative telescopic spring device 337a, with the outer sleeve 349a further elongated and the ends of the springs 344a connected to the flanges 349a and 351a by welding, clamps, bolts, or other connectors. FIGS. 27–29 show the operation of one the alternative telescopic spring devices 337a. In FIG. 27, the telescopic spring devices 337a are in a neutral, uncharged state. In FIG. 28, when the actuators are operated to extend the first attachment member, the coil springs 344a are compressed, thereby charging the springs of the energy storage mechanism. In FIG. 29, when the tethers are released (for example, by releasing the lock), the springs 344a discharge thereby pulling the second connection member 343a and unwinding the tethers from the axle. Accordingly, the drum rotates and winds in the cable at a very rapid rate.

Because the ends of the springs 344a are connected to the flanges 349a and 351a, after the springs 344a have been discharged from their compression state, the flanges then extend the springs under tension. In this arrangement, the springs 344a are recharged under tension after the tethers are wound out (and the cables are wound in), thereby providing a breaking action on the motion of the carriage. This arrangement is particularly well suited for the horizontally launched amusement rides described with reference to FIGS. 5A–5F, where the braking action can be used instead of an inclined ramp.

FIGS. 30–32 show another alternative telescopic spring device 337b, with two sets of sleeves 349b and springs 344b. As mentioned above, the telescopic spring devices can be provided with any number of springs and sleeves, as determined by the desired spring force and the vertical and lateral space constraints. As shown in FIGS. 31 and 32, in this arrangement, the vertical travel of the device 337b, and the lateral space taken up thereby, will be less than that of the embodiments 337a described above with three springs and sleeves.

Because of these advantages, the telescopic spring devices 337 can be used in a wide variety of amusement rides, including but not limited to those described herein. Generally described, when used with such amusement rides, the first connection member is coupled to the first attachment member, the second connection member is coupled directly to the cable or indirectly to the cable by the second attachment member, and the carriage is coupled to the cable. The carriage can then be launched into motion and/or the motion of the carriage can be dampened by the telescopic spring devices. For some rides, it is desirable to provide a gear reduction to minimize the length and number of concentric spring and sleeves. In that case, there can be provided a means for gathering in a greater length of cable than the length that the springs are compressed. Such gathering means can be provided by the drum, axle, and tether assembly of the winch described herein. Additionally or alternatively, the gathering means can be provided by a gearbox operably coupled to the axle, with or without an automatic transmission that changes the gearing depending on the rotational speed of the axle.

Figure 33:
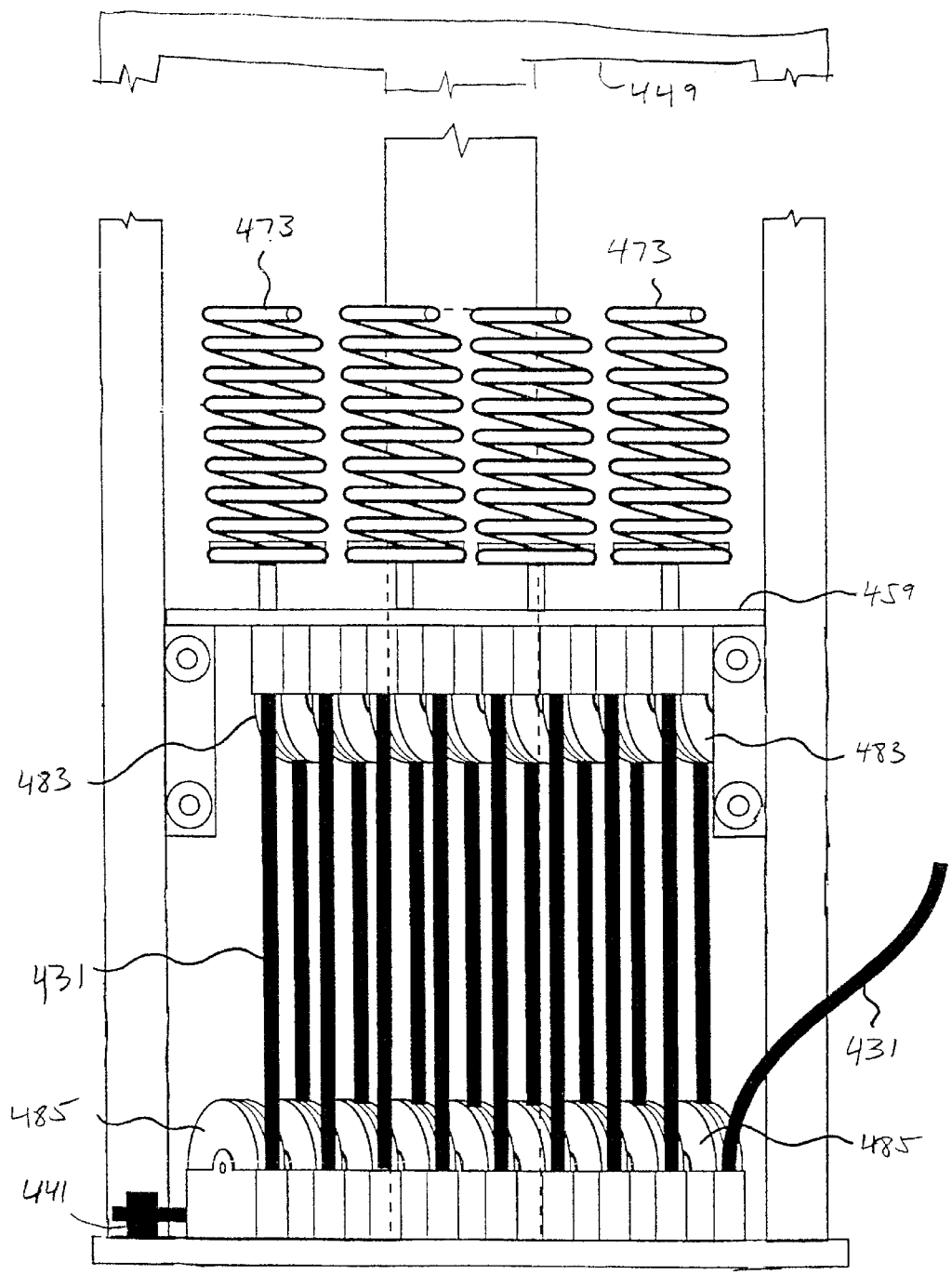
FIG. 33 is a front elevation view of a prior art cable gathering means having pulleys, with which the telescopic spring devices can be used.

Also, the telescopic spring devices can be provided as a substitute for extension springs in prior art devices. For example, referring to FIG. 33, one type of prior art amusement ride includes extensions springs 473 mounted between a top structure 449 and a lower movable structure 459, and includes a gathering means provided by pulley wheels arranged as a first bank of pulley wheels 483 connected to the lower movable structure 459 (which is similar to the second attachment member) and a second bank of pulley wheels 485 connected to a base structure 447 (which is similar to the base members), with the cable 431 routed around the pulleys and anchored at 441 to the first or second attachment member. Such a pulley mechanism is disclosed by U.S. Pat. No. 6,319,140 (PCT Patent Application No. WO99/47,221), from which FIG. 33 was reproduced, and which is hereby incorporated by reference in its entirety. In this form, the telescopic spring devices eliminate the hazards of extension springs, and produce a reliable, simple, and cost-effective mechanism.

Figure 10A:
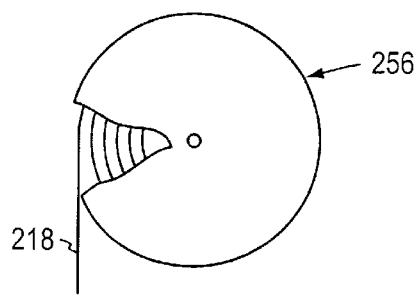
FIG. 10A is a side detail view of drum of the winch of FIG. 10, showing the cable wound thereabout in a spiral, layered arrangement.
Figure 34:
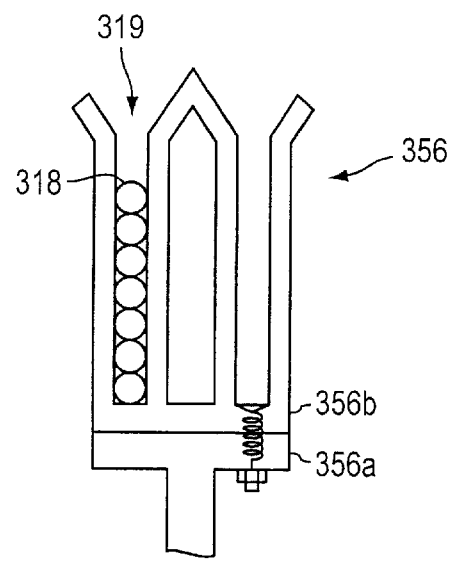
FIG. 34 is a front elevation view of a portion of the drum of FIG. 19, showing the cable wound in the grooves.
Figure 35:
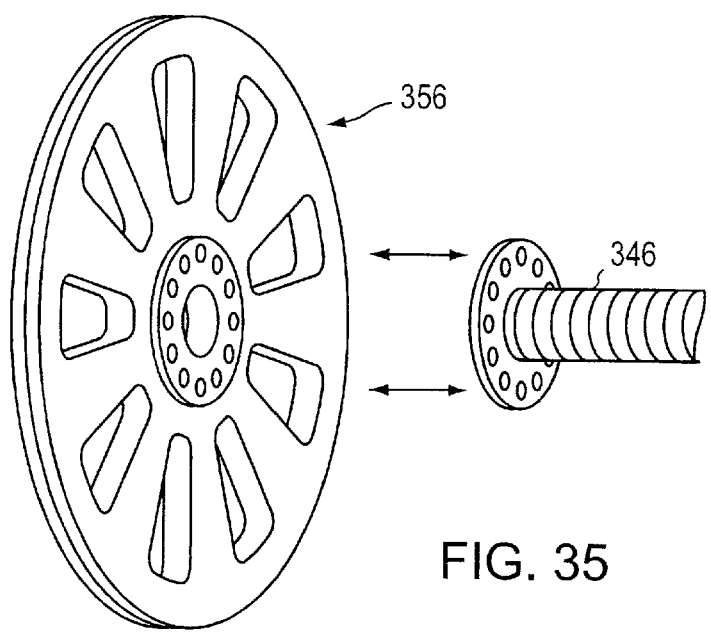
FIG. 35 is a perspective view of an alternative drum similar to that of FIG. 19, showing the drum with spokes and the connection to the axle.

Additionally, in this arrangement or any of the above described arrangements, the drum 356 can be provided with two (or another number of) grooves 319 formed therein for receiving the cable 318 in a spiral, layered, configuration, as shown in FIG. 34 (and as mentioned with reference to FIG. 10A). Also, instead of being provided as integral unit, the drum 356 can be provided with an inner portion 356a and an outer portion 356b. The drum portions 356a and 356b can be connected together by bolts and nuts (as shown in the figure), or by welding, clamps, screws, or other fasteners. In this arrangement, the inner drum portion 356a can be made of aluminum for high strength and low weight, and the outer drum portion 356b can be made of steel for high strength. Of course, other materials can be used, as may be desired. Also, as shown in FIG. 35, the drum 356 can be provided in a spoked arrangement, with the axle bolted or otherwise connected thereto.

In another aspect of the present invention, there is provided a method of propelling an amusement ride carriage. The method can comprise locking the carriage in a fixed position, charging and storing energy in one or more elastic members, and unlocking the carriage so that it is free to move. The method further comprises winding out one or more tethers about a surface of an axle, wherein the tethers are coupled to the elastic members and are wound out under the force of the energy stored in the elastic members; winding in one or more cables about a surface of one or more drums connected to the axle, wherein the cables are wound in responsive to the winding out of the tethers about the axle, the drum surfaces diameter being greater than the axle surface diameter to provide a mechanical advantage; and propelling the carriage in response to the winding in of the cables about the drums, wherein the cables are connected to the carriage.

Additionally, the step of charging and storing energy in the elastic members can be accomplished by extending a hydraulic lift or other actuator that is connected to the elastic members. Also, the step of winding in the cables can include winding the cables into grooves defined in the drums. Furthermore, the step of propelling the carriage can be include movably coupling the carriage to a ramp, launching the carriage along the ramp, and releasing the carriage from the ramp. Moreover, the method can include the step of winding out the cable from the drums to store a charge in the elastic members, and returning the carriage to a locked position so that it is ready for the next ride.

In view of the foregoing, it will be appreciated that present invention provides a winch that can be used with an amusement ride (or other device) to launch and accelerate a passenger carriage (or other structure) to a very high velocity in a very short period of time, thereby producing the thrills expected by amusement ride passengers. Additionally, a ride incorporating the winch does not have bungee cords or other components that requirement frequent replacement to maintain the safety of the ride, or that carry the stigma of being unsafe. Furthermore, when used with the winch, the ride includes an automatic braking and dampening mechanism for controlling the oscillatory or other motion of the carriage. Moreover, the winch can be produced from readily available components at a reasonable cost, and is simple and reliable to operate and maintain.

In the embodiments described above and the following claims, the words "a," "an," and "one" are not intended to mean only "one" but can also mean any number greater than one, unless specified otherwise herein. Additionally, the methods are not intended to be limited to the specific sequence of steps described, unless specified otherwise herein. It should be understood that the foregoing description relates only to the exemplary embodiments of the present invention, and that numerous changes may be made therein without departing from the spirit and scope of the invention as defined by the following claims.

The invention claimed is:

1. A rapid-winding winch for an amusement ride having a passenger carriage connected to one or more cables, the winch comprising:
   a) an energy storage mechanism having one or more elastic members;
   b) one or more tethers coupled to the elastic members;
   c) an axle having a winding surface with a diameter, wherein the tethers are windable and unwindable about the surface of the axle; and
   d) one or more drums coupled directly or indirectly to the axle and having a winding surface with a diameter, wherein the cables are windable and unwindable about the surface of the drums, the drum surfaces diameter being greater than the axle surface diameter to provide a mechanical advantage when winding and unwinding the cables to move the carriage.

2. The winch of claim 1, wherein the energy storage mechanism comprises at least one telescopic spring device having one or more sleeves and wherein the elastic members comprise springs concentrically arranged within the sleeves, wherein the springs are compressed by the sleeves when the sleeves are extended telescopically.

3. The winch of claim 1, wherein the energy storage mechanism has a first attachment member and a second attachment member, with the elastic members connected between the first and second attachment members and the tethers connected to the second attachment member.

4. The winch of claim 1, wherein the drum surfaces have at least one groove defined therein for receiving the cables.

5. The winch of claim 1, further comprising a lock releasably securing the carriage in a fixed position.

6. The winch of claim 1, further comprising a launch frame having a launch platform where a person may stand or sit, wherein the energy storage mechanism, the tethers, the axle, and the drums are coupled to the launch frame, and the launch frame is coupled to the tower so that the launch frame can be hoisted to an elevated position.

7. A rapid-winding winch for an amusement ride having a passenger carriage connected to one or more cables, the winch comprising:
   a) an energy storage mechanism having one or more elastic members, a first attachment member and a second attachment member with the elastic members connected between the first and second attachment members, and one or more actuators coupled to the first attachment member;
   b) one or more tethers connected to the second attachment member;
   c) an axle having a winding surface with a diameter, wherein the tethers are windable and unwindable about the surface of the axle;
   d) one or more drums coupled directly or indirectly to the axle and having a winding surface with a diameter, wherein the cables are windable and unwindable about the surface of the drums, the drum surfaces diameter being greater than the axle surface diameter to provide a mechanical advantage when winding and unwinding the cables to move the carriage; and
   e) a lock releasably securing the carriage in a fixed position.

8. The winch of claim 7, wherein the drum surfaces have at least one groove defined therein for receiving the cables in a spiral, layered arrangement.

9. The winch of claim 7, wherein the actuators comprise hydraulic or pneumatic cylinders and the lock comprises a magnet.

10. The winch of claim 7, wherein the energy storage mechanism comprises at least one telescopic spring device having a plurality of sleeves concentrically arranged and wherein the elastic members comprise a plurality of springs concentrically arranged within the sleeves, wherein the springs are compressed by the sleeves when the sleeves are extended telescopically.

11. The winch of claim 7, wherein the elastic members comprise extension springs.

12. The winch of claim 7, wherein the second attachment member has an opening defined therein and a safety member extends through the opening.

13. A rapid-winding winch for an amusement ride having a passenger carriage, the winch comprising:
   a) an energy storage mechanism having one or more elastic members;
   b) one or more tethers coupled to the elastic members;
   c) an axle having a winding surface with a diameter, wherein the tethers are windable and unwindable about the surface of the axle;
   d) one or more cables;
   e) one or more drums coupled directly or indirectly to the axle and having a winding surface with a diameter, wherein the cables are windable and unwindable about the surface of the drums, the drum surfaces diameter being greater than the axle surface diameter to provide a mechanical advantage when winding and unwinding the cables to move the carriage; and
   f) a race member coupled to one or more of the cables, wherein the race member is adapted to engage a portion of the carriage to launch the carriage.

14. The winch of claim 13, wherein the drum surfaces have at least one groove defined therein for receiving the cables in a spiral, layered arrangement.

15. The winch of claim 13, further comprising a ramp with a track formed therein or thereon, wherein the race member is guided by the track.

16. The winch of claim 15, wherein the ramp has a section that is linear, curved, looped, sinusoidal, corkscrewed, elevated and intermediate, elevated and istal, or suspended above ground.

* * * * *